US012736988B2

(12) United States Patent
Verkhovskaya et al.

(10) Patent No.: US 12,736,988 B2
(45) Date of Patent: Sep. 15, 2026

(54) MOTOR HEALTH MONITOR

(71) Applicant: Wing Aviation LLC, Palo Alto, CA (US)

(72) Inventors: Anna Verkhovskaya, San Mateo, CA (US); André Peter Prager, Sunnyvale, CA (US)

(73) Assignee: Wing Aviation LLC, Palo Alto, CA (US)

( * ) Notice: Subject to any disclaimer, the term of this patent is extended or adjusted under 35 U.S.C. 154(b) by 221 days.

(21) Appl. No.: 18/731,029

(22) Filed: May 31, 2024

(65) Prior Publication Data

US 2025/0370483 A1 Dec. 4, 2025

(51) Int. Cl.
*G05D 1/85* (2024.01)
*B64D 45/00* (2006.01)
*G05D 109/20* (2024.01)

(52) U.S. Cl.
CPC ............. *G05D 1/854* (2024.01); *B64D 45/00* (2013.01); *B64D 2045/0085* (2013.01); *G05D 2109/20* (2024.01)

(58) Field of Classification Search
None
See application file for complete search history.

(56) References Cited

U.S. PATENT DOCUMENTS 9,244,147 B1 1/2016 Soundararajan et al.
9,307,383 B1 4/2016 Patrick
9,728,014 B2 8/2017 Khalaschi et al.
9,852,644 B2 12/2017 Salnikov et al.
9,944,404 B1 * 4/2018 Gentry .................. B64D 45/00
10,053,236 B1 8/2018 Buchmueller et al.
10,124,893 B1 11/2018 Aalund et al.
10,270,381 B2 4/2019 Tao
10,775,784 B2 9/2020 Gu
(Continued)

FOREIGN PATENT DOCUMENTS

KR 20160048276 A 5/2016
WO 2016/179637 A1 11/2016
WO 2017/098696 A1 6/2017

OTHER PUBLICATIONS

International Searching Authority, International Search Report and Written Opinion mailed Jun. 21, 2019, issued in connection with International Patent Application No. PCT/US2019/027288, filed Apr. 12, 2019, 14 pages.

(Continued)

*Primary Examiner* — James J Lee
*Assistant Examiner* — Elizabeth Galyn Martinez
(74) *Attorney, Agent, or Firm* — McDonnell Boehnen Hulbert & Berghoff LLP

(57) ABSTRACT

A method includes causing an uncrewed aerial vehicle (UAV) to navigate through a trajectory. The method also includes receiving first motor data representing operation of a first motor during navigation through the trajectory and receiving second motor data representing operation of a second motor during navigation through the trajectory. The method further includes comparing the first motor data with the second motor data. The method also includes, based on the comparison of the first motor data and the second motor data, determining a motor failure state. The method additionally includes causing the UAV to navigate based on the motor failure state.

20 Claims, 14 Drawing Sheets

(56) References Cited

U.S. PATENT DOCUMENTS

| | | | | |
|---|---|---|---|---|
| 11,544,161 | B1 | 1/2023 | Yarlagadda et al. | |
| 11,562,654 | B2 * | 1/2023 | Krawiec | G07C 5/008 |
| 11,691,755 | B2 | 7/2023 | Gu et al. | |
| 11,912,432 | B2 | 2/2024 | Jones et al. | |
| 2007/0093946 | A1 | 4/2007 | Gideoni | |
| 2008/0125933 | A1 | 5/2008 | Williams et al. | |
| 2012/0259505 | A1 | 10/2012 | Turban et al. | |
| 2013/0026299 | A1 | 1/2013 | Constans et al. | |
| 2015/0225081 | A1 | 8/2015 | Stabler et al. | |
| 2015/0344149 | A1 | 12/2015 | Mumaw et al. | |
| 2016/0124434 | A1 | 5/2016 | Gariepy et al. | |
| 2016/0217698 | A1 | 7/2016 | Liu et al. | |
| 2016/0307447 | A1 | 10/2016 | Johnson et al. | |
| 2017/0106986 | A1 | 4/2017 | Sweeny et al. | |
| 2017/0235018 | A1 | 8/2017 | Foster et al. | |
| 2018/0090014 | A1 | 3/2018 | Kline et al. | |
| 2019/0005828 | A1 | 1/2019 | Costas | |
| 2019/0061531 | A1 | 2/2019 | Harrington et al. | |
| 2019/0207543 | A1 * | 7/2019 | Lan | H02P 21/18 |
| 2022/0234734 | A1 * | 7/2022 | Lai | G08G 5/57 |
| 2024/0210963 | A1 * | 6/2024 | Stollmeyer | G05B 23/0286 |
| 2024/0429840 | A1 * | 12/2024 | Ka | H02K 11/215 |

OTHER PUBLICATIONS

International Searching Authority, International Search Report and Written Opinion mailed on Jan. 19, 2022, issued in connection with International Patent Application No. PCT/US2021/071671, filed Oct. 10, 2021, 10 pages.

The International Bureau of WIPO, International Preliminary Report on Patentability mailed on Oct. 20, 2020, issued in connection with International Patent Application No. PCT/US2019/027288 filed on Apr. 12, 2019, 8 pages.

* cited by examiner

MOTOR HEALTH MONITOR

BACKGROUND

An uncrewed vehicle, which may also be referred to as an autonomous vehicle, is a vehicle capable of travel without a physically-present human operator. An uncrewed vehicle may operate in a remote-control mode, in an autonomous mode, or in a partially autonomous mode.

When an uncrewed vehicle operates in a remote-control mode, a pilot or driver that is at a remote location can control the uncrewed vehicle via commands that are sent to the uncrewed vehicle via a wireless link. When the uncrewed vehicle operates in autonomous mode, the uncrewed vehicle typically moves based on pre-programmed navigation waypoints, dynamic automation systems, or a combination of these. Further, some uncrewed vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of uncrewed vehicles exist for various different environments. For instance, uncrewed vehicles exist for operation in the air, on the ground, underwater, and in space. Examples of uncrewed aerial vehicles (UAVs) include quad-copters and tail-sitter UAVs, among others. Uncrewed vehicles also exist for hybrid operations in which multi-environment operation is possible. Examples of hybrid uncrewed vehicles include an amphibious craft that is capable of operation on land as well as on water or a floatplane that is capable of landing on water as well as on land. Other examples are also possible.

SUMMARY

Examples disclosed herein relate to monitoring motor health. An aircraft or other vehicle may include a plurality of motors. A computing system associated with the aircraft or other vehicle may receive signals from each of the motors. The computing system may compare the signals from the motors to determine an extent to which the signals match. Based on the comparison, the computing system may determine whether a motor on the vehicle has failed.

In an embodiment, a method is provided. The method includes causing an uncrewed aerial vehicle (UAV) to navigate through a trajectory. The method also includes receiving first motor data representing operation of a first motor during navigation through the trajectory and receiving second motor data representing operation of a second motor during navigation through the trajectory. The method further includes comparing the first motor data with the second motor data. The method also includes, based on the comparison of the first motor data and the second motor data, determining a motor failure state. The method additionally includes causing the UAV to navigate based on the motor failure state.

In another embodiment, a computing system is provided. The computing system is configured to cause an uncrewed aerial vehicle (UAV) to navigate through a trajectory. The computing system is also configured to receive first motor data representing operation of a first motor during navigation through the trajectory and receiving second motor data representing operation of a second motor during navigation through the trajectory. The computing system is further configured to compare the first motor data with the second motor data. The computing system is further configured to, based on the comparison of the first motor data and the second motor data, determine a motor failure state. The computing system is additionally configured to cause the UAV to navigate based on the motor failure state.

In a further embodiment, a non-transitory computer readable medium is provided. The non-transitory computer readable medium comprises program instructions executable by one or more processors to perform operations. The operations include causing an uncrewed aerial vehicle (UAV) to navigate through a trajectory. The operations also include receiving first motor data representing operation of a first motor during navigation through the trajectory and receiving second motor data representing operation of a second motor during navigation through the trajectory. The operations further include comparing the first motor data with the second motor data. The operations also include, based on the comparison of the first motor data and the second motor data, determining a motor failure state. The operations additionally include causing the UAV to navigate based on the motor failure state.

In another embodiment, a system is provided that includes means for causing an uncrewed aerial vehicle (UAV) to navigate through a trajectory. The system also includes means for receiving first motor data representing operation of a first motor during navigation through the trajectory and receiving second motor data representing operation of a second motor during navigation through the trajectory. The system additionally includes means for comparing the first motor data with the second motor data. The system further includes means for, based on the comparison of the first motor data and the second motor data, determining a motor failure state. The system also includes means for causing the UAV to navigate based on the motor failure state.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
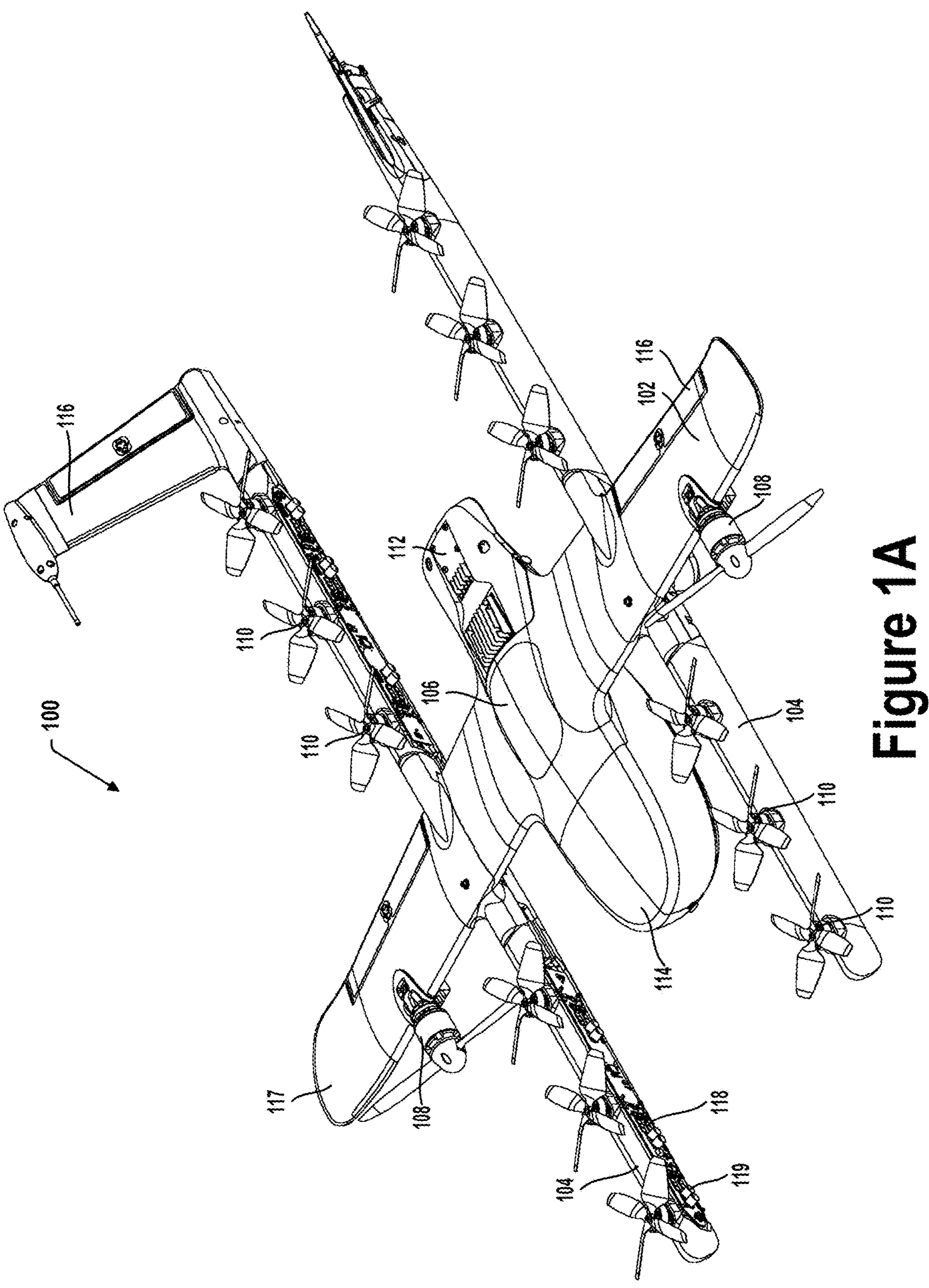
FIG. 1A is an illustration of an uncrewed aerial vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For the purposes of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

An unmanned aerial vehicle (UAV) may include one or more motors used to control movement of the UAV. For example, each of the one or more motors may be connected to propellers, flight control surfaces (e.g., ailerons, elevators, rudders, etc.), and/or other components on the UAV. At least some of these components may be used to control the flight trajectory of the UAV. In some cases, the UAV may include motors and/or corresponding components that are arranged symmetrically and/or in other predetermined arrangement(s). Due to this symmetry and/or predetermined arrangement(s), the manner in which such motors and/or corresponding components are controlled (e.g., to cause the UAV to navigate in a particular trajectory) may also be symmetric and/or exhibit a predetermined relationship/pattern. For example, the UAV may have two motors mounted symmetrically on either side of the UAV. Depending on the intended trajectory of the UAV, the UAV may control the motors to spin in a similar manner (e.g., when intending to actuate both sides of the UAV uniformly) or in a different manner (e.g., when intending to apply more force to one side than the other).

Issues may arise where one or more motors on the UAV fail. Failure of the motors on the UAV may lead to the UAV no longer having the capability to perform some flight maneuvers. Thus, the UAV might not be fully controllable and/or might not be able to fly certain flight trajectories. Accordingly, it is desirable to detect, predict, and/or quantify the likelihood of a motor entering a failure state, and to take corrective action before this failure state affects the UAV's ability to perform some flight maneuvers.

Provided herein are methods, systems, and techniques to detect, predict, and/or quantify motor failures. In an example UAV, one or more motors may be connected to a computing system, which may direct motor movements and/or collect motor data that indicates motor health and/or performance. For example, the computing system may receive an indication of the amount of current drawn by each motor, a position of each motor, a speed of each motor, and/or an acceleration of each motor, among other possibilities. The computing system may use the amount of current being drawn by each motor, the position of each motor, the speed of each motor, and/or the acceleration of each motor as an indication of whether the motor is operating properly. In some cases, the computing system may compare the measured motor current, position, speed, and/or acceleration to a commanded current, position, speed, and/or acceleration and, based on this comparison, determine whether the motor is operating properly.

In some examples, the motors and/or the components controlled thereby may be arranged symmetrically and/or in a particular (predetermined) manner on the UAV such that motor data generated thereby is predictable and/or has a predictable relationship to motor data generated by one or more other motors. For example, a first motor of a first side of the UAV may be arranged symmetrically with a second motor on a second side of the UAV. Since the two motors are symmetrically arranged on the two sides of the UAV, both motors may be expected to perform in the same or similar manner when both sides of the UAV are moved and/or controlled symmetrically. Thus, the computing system may determine whether the first motor and/or the second motor is malfunctioning based on determining whether first motor data generated in connection with operation of the first motor matches second motor data generated in connection with operation of the second motor.

As another example, the UAV may include a first motor and a second motor that are arranged asymmetrically on the UAV, and the spatial relationship therebetween may be known. Since the two motors are arranged asymmetrically on the two sides of the UAV, these motors may be expected to perform differently when both sides of the UAV are moved and/or controlled symmetrically. Further, when the UAV is moved and/or controlled asymmetrically in a manner than utilizes both motors in the same or similar manner, these motors may be expected perform in the same or similar manner. The computing system may thus compare first motor data received from the first motor and second motor data received from the second motor and determine whether one or more of these motors is malfunctioning based on whether the first motor data received from the first motor matches the second motor data received from the second motor.

To facilitate this process, the computing system may first cause the UAV to navigate through a predetermined path, and while the UAV is navigating through the predetermined path, the computing system may receive the motor data from one or more motors on the UAV. The predetermined path may include one or more flight maneuvers, each of which may be expected to utilize two or more motors in the same or similar manner, or in a different manner. That is, for each flight maneuver, the relationship between performances of two or more motors may be known and/or predetermined. The computing system may compare the motor data received while the UAV navigates through the predetermined path to determine the health of the motor(s).

For example, the computing system may compare first motor data received from a first motor and second motor data received a second motor, where the first motor and the second motor are located symmetrically on the UAV. The predetermined path may be a straight path. The computing system may receive an indication that flying through the predetermined path is associated with the first motor data matching the second motor data (due to symmetric usage of these motors). However, when comparing the first motor data with the second motor data, the computing system may determine that the first motor data and the second motor data do not match (e.g., differ by more than a threshold extent/value). Accordingly, the computing system may determine that the first motor or the second motor has failed, and the computing system may cause the UAV to, for example, navigate back to its takeoff location to be maintained.

As another example, the predetermined path may be a curved path. The computing system may receive first motor data from the first motor and second motor data from the second motor located symmetrically from each other. Due to the curved path, the first and the second motors may be expected to generate different motor data (e.g., draw different amounts of current). The computing system may compare the first motor data from the first motor and the second motor data received from the second motor, and if the computing system determines that the first motor data is the same as the second motor data, the computing system may cause the UAV to navigate back to its takeoff location to be maintained. In contrast, if the computing system determines that the first motor data is different than the second motor data (e.g., by an amount/extent proportional to the asymmetric usage of the motors), the computing system may cause the UAV to continue the mission and navigate towards its initial destination.

The computing system may also use historical data as a basis to determine motor health. For example, the computing system may store motor data relating to historical comparisons of the first motor data and the second motor data, including, for example, whether the first motor data differed from the second motor data, how much the first motor data differed from the second motor data, whether the UAV was navigating through a predetermined path, which predetermined path the UAV was navigating through, whether the first motor or the second motor had failed, and so on. During UAV operation, the computing system may compare the first data and the second data and determine whether the comparison matches the stored historical data. If the computing system determines that the comparison of the first motor data and the second motor data matches historical data that indicates that the first motor or the second motor has failed, the computing system may perform a contingency operation. If the computing system determines that the comparison of the first motor data and the second motor data matches historical data that indicates that the first motor and the second motor were operating normally, the computing system may continue performing its assigned mission.

II. EXAMPLE UNCREWED VEHICLES

Herein, the terms “uncrewed aerial system” and “UAV” refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms “drone,” “uncrewed aerial vehicle system” (UAVS), or “uncrewed aerial vehicle” may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV’s forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a “structural H-frame” or an “H-frame” (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
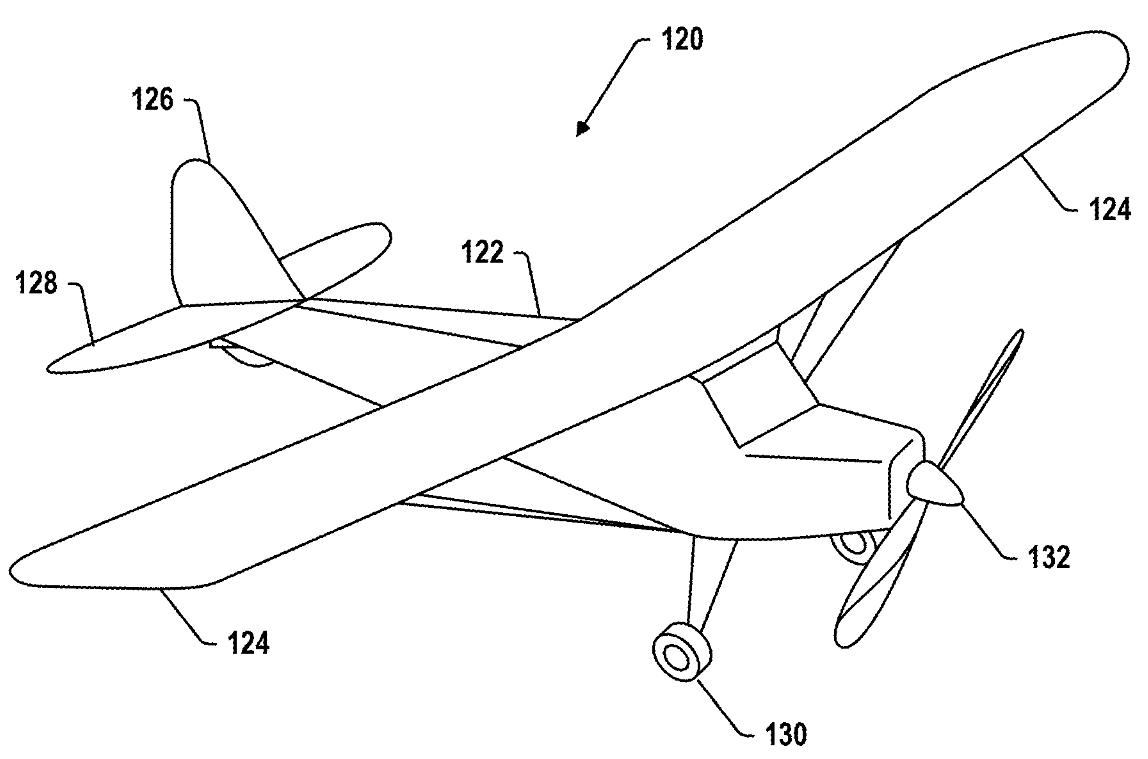
FIG. 1B is a simplified illustration of an uncrewed aerial vehicle, in accordance with example embodiments.

Similarly, FIG. 1B shows another example of a fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
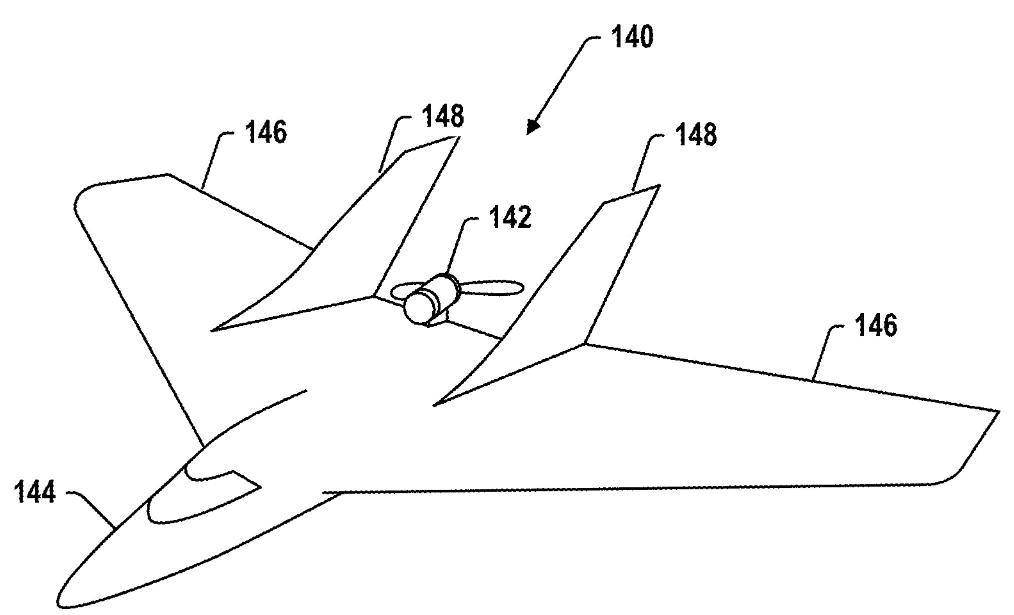
FIG. 1C is a simplified illustration of an uncrewed aerial vehicle, in accordance with example embodiments.

FIG. 1C shows an example of UAV 140 with a propeller in a pusher configuration. The term "pusher" refers to the fact that propulsion unit 142 is mounted at the back of UAV 140 and "pushes" the vehicle forward, in contrast to the propulsion unit 142 being mounted at the front of UAV 140. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
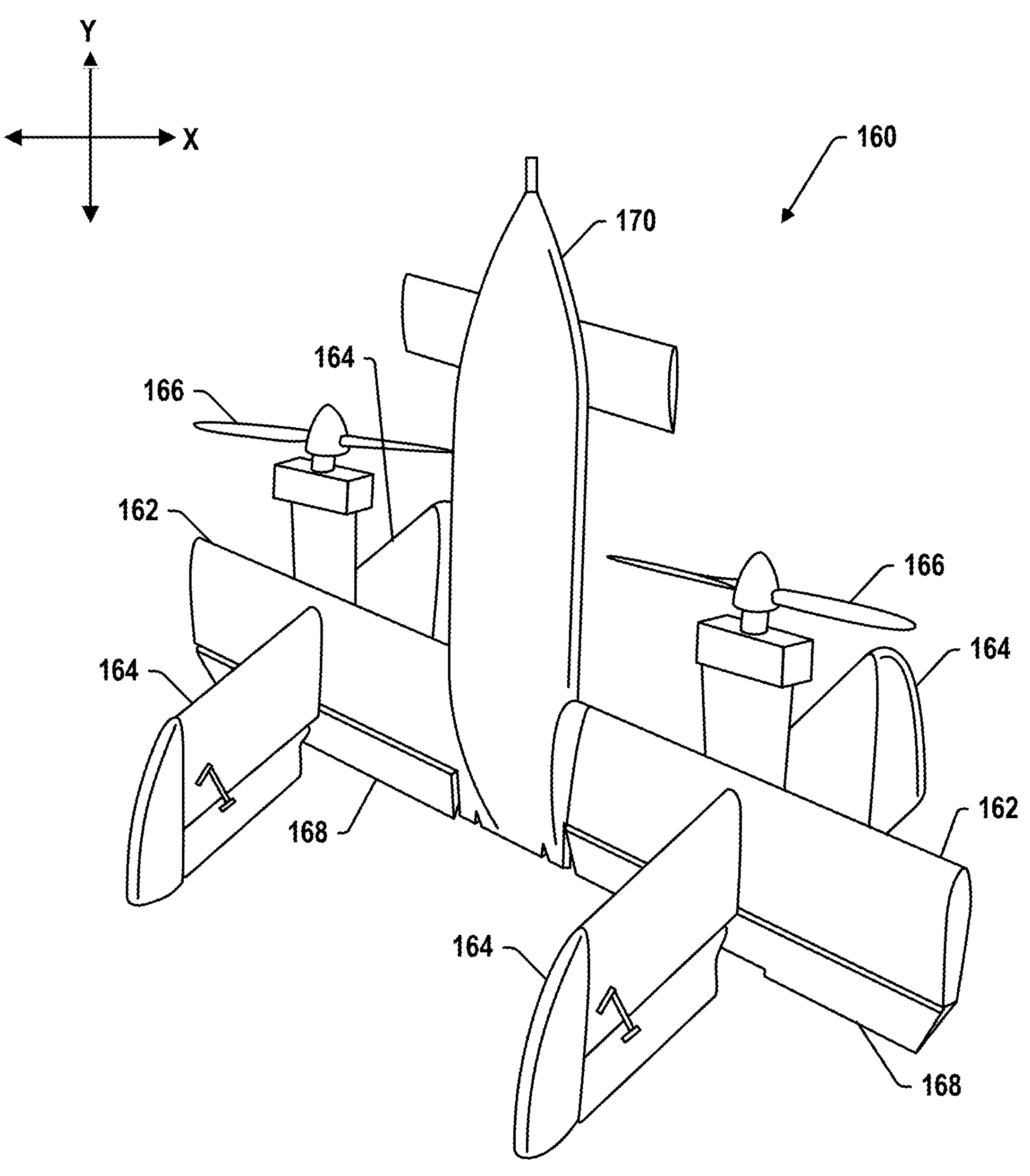
FIG. 1D is a simplified illustration of an uncrewed aerial vehicle, in accordance with example embodiments.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
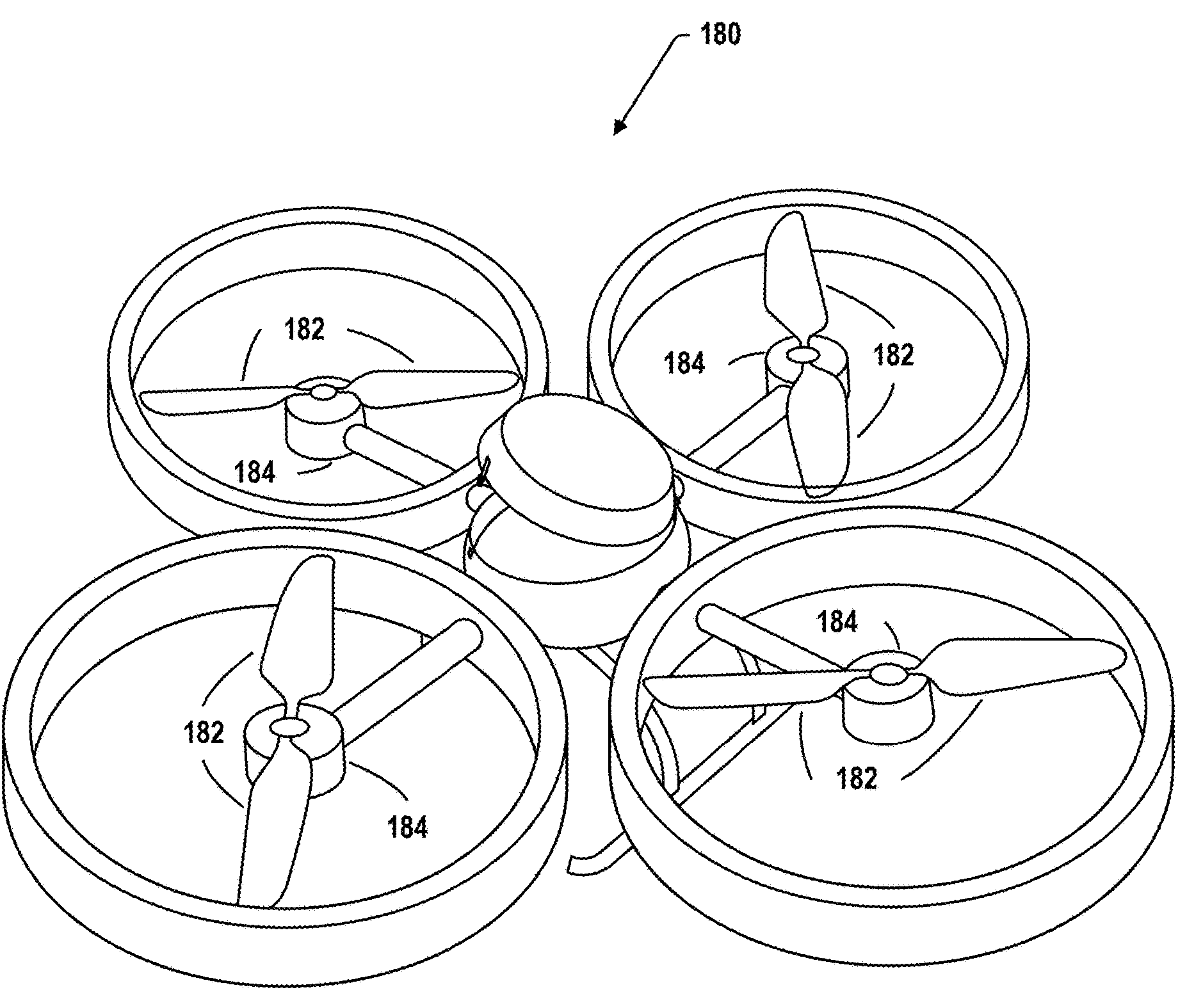
FIG. 1E is a simplified illustration of an uncrewed aerial vehicle, in accordance with example embodiments.

As noted above, some embodiments may involve other types of UAVs, in addition to or in the alternative to fixed-wing UAVs. For instance, FIG. 1E shows an example of rotorcraft 180 that is commonly referred to as a multicopter. Multicopter 180 may also be referred to as a quadcopter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

Figure 2:
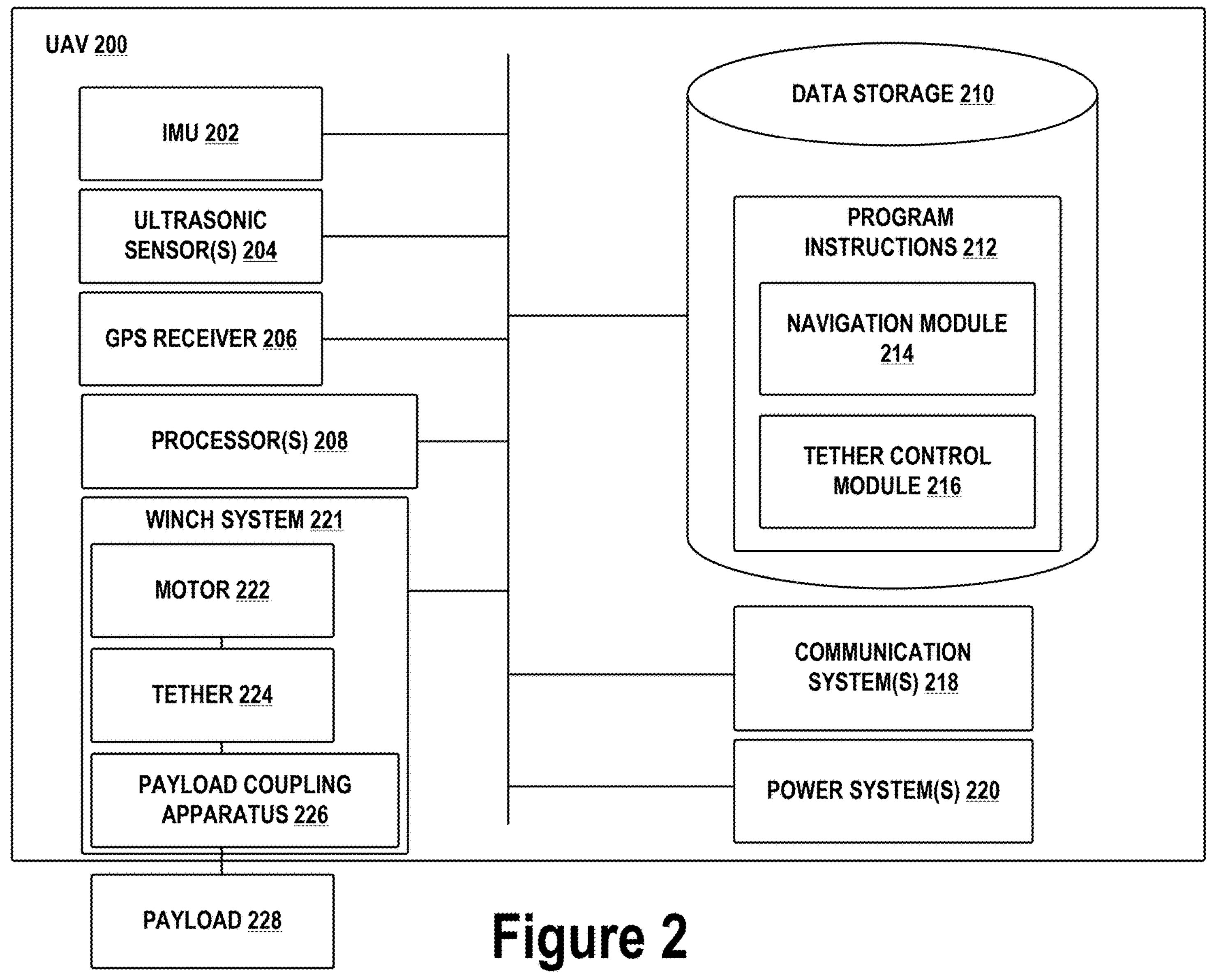
FIG. 2 is a simplified block diagram illustrating components of an uncrewed aerial system, in accordance with example embodiments.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS receiver 206, among other possible sensors and sensing systems.

In the illustrated embodiment, UAV 200 also includes processor(s) 208. Processor 208 may be a general-purpose processor or a special purpose processor (e.g., digital signal processors, application specific integrated circuits, etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein. For instance, in the illustrated embodiment, program instructions 212 include navigation module 214 and tether control module 216.

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to the caller's location, as indicated, at least in part, by the GPS coordinates provided by their mobile device. Other examples are also possible.

Navigation module 214 may provide functionality that allows UAV 200 to, for example, move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location, navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in reaching the specific target delivery location. For example, the UAV 200 may display a visual message requesting such assistance in a graphic display or play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals—in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

In a further aspect, UAV 200 includes one or more communication system(s) 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 902.11 protocol), Long-Term Evolution (LTE), WiMAX (e.g., an IEEE 902.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication systems 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may one or more food items, purchased goods, medical items, or any other object(s) having a size and weight suitable to be transported between two locations by the UAV. In other embodiments, payload 228 may simply be the one or more items that are being delivered (e.g., without any package housing the items).

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include winch system 221 controlled by tether control module 216 in order to lower payload 228 to the ground while UAV 200 hovers above. As shown in FIG. 2, winch system 221 may include tether 224, and tether 224 may be coupled to payload 228 by payload coupling apparatus 226. Tether 224 may be wound on a spool that is coupled to motor 222 of the UAV. Motor 222 may take the form of a DC motor (e.g., a servo motor) that can be actively controlled by a speed controller. Tether control module 216 can control the speed controller to cause motor 222 to rotate the spool, thereby unwinding or retracting tether 224 and lowering or raising payload coupling apparatus 226. In practice, the speed controller may output a desired operating rate (e.g., a desired RPM) for the spool, which may correspond to the speed at which tether 224 and payload 228 should be lowered towards the ground. Motor 222 may then rotate the spool so that it maintains the desired operating rate.

In order to control motor 222 via the speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as motor 222 causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

Based on the data from the speed sensor, tether control module 216 may determine a rotational speed of motor 222 and/or the spool and responsively control motor 222 (e.g., by increasing or decreasing an electrical current supplied to motor 222) to cause the rotational speed of motor 222 to match a desired speed. When adjusting the motor current, the magnitude of the current adjustment may be based on a proportional-integral-derivative (PID) calculation using the determined and desired speeds of motor 222. For instance, the magnitude of the current adjustment may be based on a present difference, a past difference (based on accumulated error over time), and a future difference (based on current rates of change) between the determined and desired speeds of the spool.

In some embodiments, tether control module 216 may vary the rate at which tether 224 and payload 228 are lowered to the ground. For example, the speed controller may change the desired operating rate according to a variable deployment-rate profile and/or in response to other factors in order to change the rate at which payload 228 descends toward the ground. To do so, tether control module 216 may adjust an amount of braking or an amount of friction that is applied to tether 224. For example, to vary the tether deployment rate, UAV 200 may include friction pads that can apply a variable amount of pressure to tether 224. As another example, UAV 200 can include a motorized braking system that varies the rate at which the spool lets out tether 224. Such a braking system may take the form of an electromechanical system in which motor 222 operates to slow the rate at which the spool lets out tether 224. Further, motor 222 may vary the amount by which it adjusts the speed (e.g., the RPM) of the spool, and thus may vary the deployment rate of tether 224. Other examples are also possible.

In some embodiments, tether control module 216 may be configured to limit the motor current supplied to motor 222 to a maximum value. With such a limit placed on the motor current, there may be situations where motor 222 cannot operate at the desired rate specified by the speed controller. For instance, there may be situations where the speed controller specifies a desired operating rate at which motor 222 should retract tether 224 toward UAV 200, but the motor current may be limited such that a large enough downward force on tether 224 would counteract the retracting force of motor 222 and cause tether 224 to unwind instead. A limit on the motor current may be imposed and/or altered depending on an operational state of UAV 200.

In some embodiments, tether control module 216 may be configured to determine a status of tether 224 and/or payload 228 based on the amount of current supplied to motor 222. For instance, if a downward force is applied to tether 224 (e.g., if payload 228 is attached to tether 224 or if tether 224 gets snagged on an object when retracting toward UAV 200), tether control module 216 may need to increase the motor current in order to cause the determined rotational speed of motor 222 and/or spool to match the desired speed. Similarly, when the downward force is removed from tether 224 (e.g., upon delivery of payload 228 or removal of a tether snag), tether control module 216 may need to decrease the motor current in order to cause the determined rotational speed of motor 222 and/or spool to match the desired speed. As such, tether control module 216 may be configured to monitor the current supplied to motor 222. For instance, tether control module 216 could determine the motor current based on sensor data received from a current sensor of the motor or a current sensor of power system 220. In any case, based on the current supplied to motor 222, tether control module 216 may determine if payload 228 is attached to tether 224, if someone or something is pulling on tether 224, and/or if payload coupling apparatus 226 is pressing against UAV 200 after retracting tether 224. Other examples are possible as well.

During delivery of payload 228, payload coupling apparatus 226 can be configured to secure payload 228 while being lowered from the UAV by tether 224, and can be further configured to release payload 228 upon reaching ground level. Payload coupling apparatus 226 can then be retracted to the UAV by reeling in tether 224 using motor 222.

In some implementations, payload 228 may be passively released once it is lowered to the ground. For example, a passive release mechanism may include one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

Figure 3:
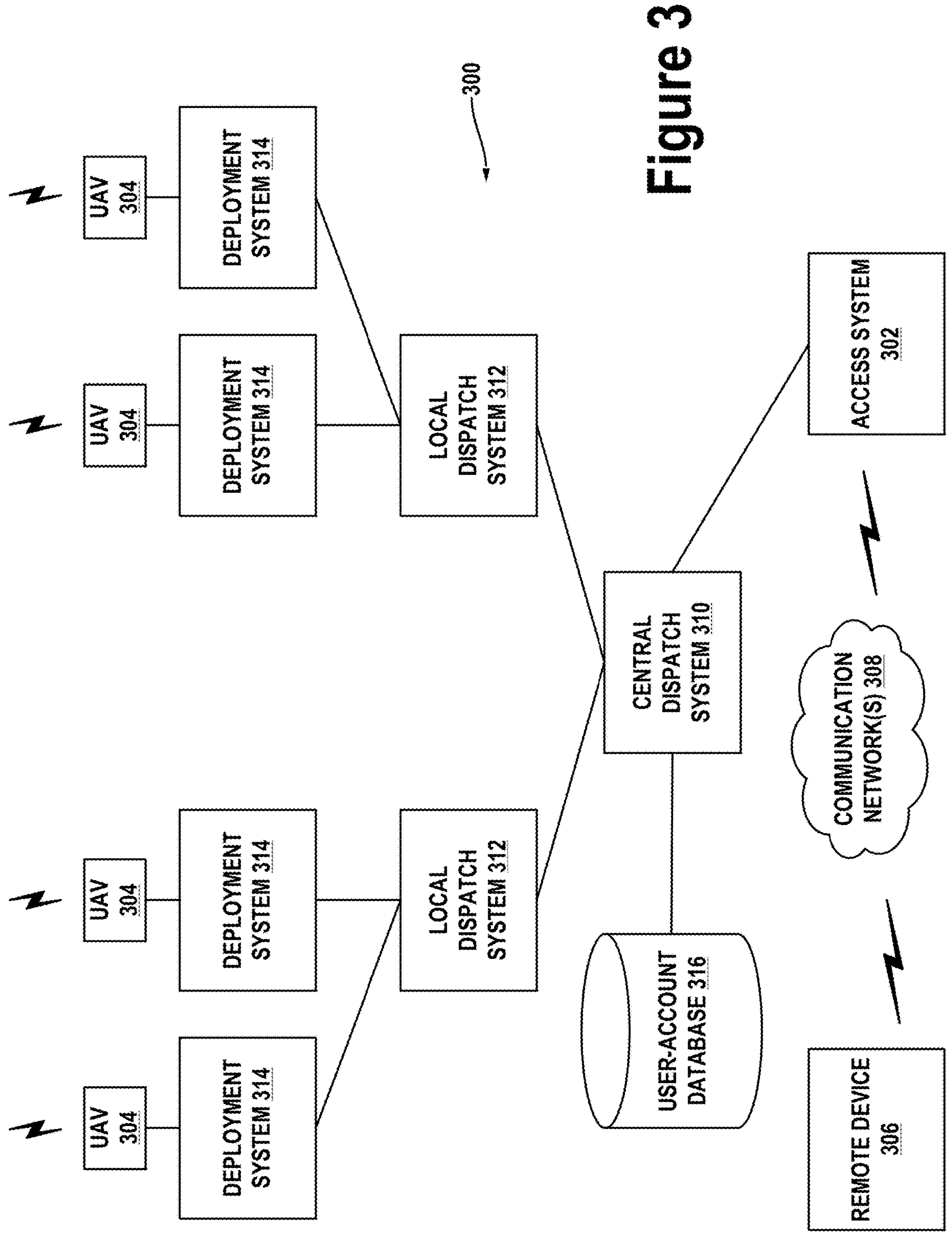
FIG. 3 is a simplified block diagram illustrating a distributed UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UAVs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, IC, ID, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be multiple instances of remote device 306 associated with a common item provider account (e.g., an account used by multiple employees and/or owners of a particular restaurant). Additionally, in such embodiments, remote device 306 may be utilized to send item provider submissions to a transport provider computing system (e.g., central dispatch system 310 and or local dispatch system 312), which each indicate a respective quantitative measure for a given amount of UAV transport service at a given future time. For example, remote device 306 may be utilized to generate and send an item provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. Deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to deployment system 314 for re-deployment.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an aerial transport service provider (ATSP) to deliver, can register for an item provider account with UAV system 300. As such, user-account database 316 may include authorization information for a given item provider account (e.g., one or more user name and password combinations), and/or other information that may be used to authorize access to a given item provider account. Alternatively, data for item provider accounts may be kept in a separate database from recipient user accounts. Other data structures and storage configurations for storing such account data are also possible.

Figure 4:
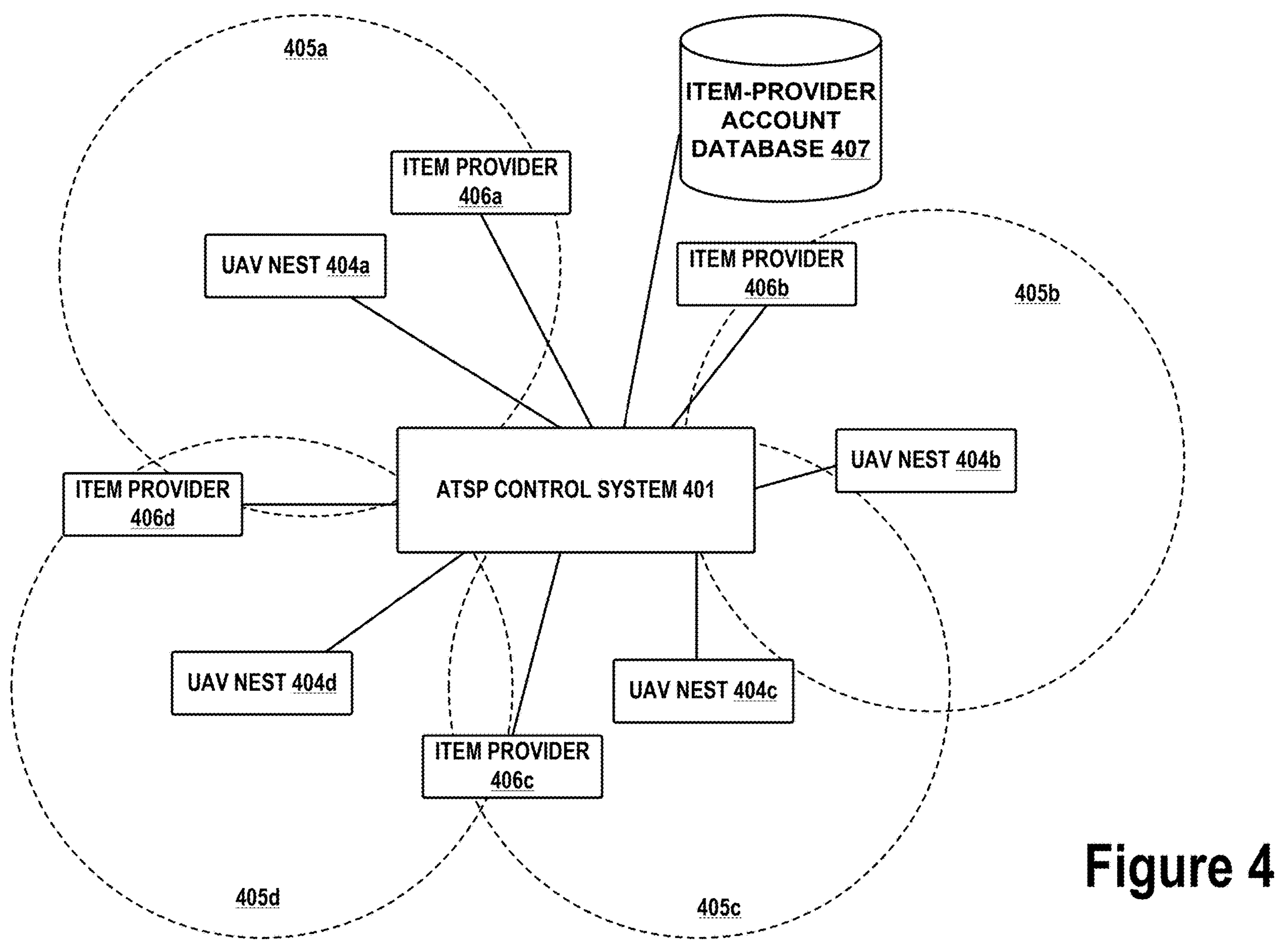
FIG. 4 is a block diagram showing an example arrangement for an aerial transport provider control system, in accordance with example embodiments.

An aerial transport service provider (ATSP) may be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the ATSP, via which the third-parties can request and/or purchase UAV transport services from the ATSP. Further, the third-party entities could interface with recipients (e.g., customers) directly, or through computing systems (e.g., applications and/or server systems) provided by the ATSP FIG. 4 is a block diagram showing an example arrangement for an aerial transport service provider control system 401, which coordinates UAV transport services for a plurality of item providers that are located remotely from the service provider's central UAV dispatch locations (e.g., UAV nests). The ATSP may be a separate entity from the item providers. As shown, ATSP control system 401 may be communicatively coupled to computing or control systems of UAV nests 404*a*, 404*b*, 404*c*, and 404*d* (i.e., UAV nests 404*a-d*), and communicatively coupled to computing systems of item providers 406*a*, 406*b*, 406*c*, and 406*d* (i.e., item providers 406*a-d*). Such communicative couplings may be implemented using various types of wired and/or wireless communication protocols and networks.

Each of UAV nests 404*a-d* is a facility where UAVs can be stored for at least a short period of time, and from which UAVs can begin carrying out a UAV transport task (e.g., where UAVs can take off). In some implementations, some or all of the UAV nests may take the form of a local dispatch system and one or more deployment systems, such as those described in reference to FIG. 3 above. Of course, some or all of the UAV nests could also take other forms and/or perform different functions.

Each of the computing systems of item providers 406*a-d* may be associated with a different item provider account. As such, one or more of the computing systems associated with item providers 406*a-d* may include one or more computing devices that are authorized to access the corresponding item provider account with the ATSP. Further, the ATSP may store data for item provider accounts in an item provider account database 407.

In practice, one or more of the computing systems of item providers 406*a-d* may include one or more remote computing devices (e.g., such as one or more remote devices 306 described in reference to FIG. 3), which have logged in to or otherwise been authorized to access the same item provider account (e.g., cell phones, laptops, and/or computing devices of a business's employees). Additionally or alternatively, one or more of the computing systems of item providers 406*a-d* may be implemented with less of an ad-hoc approach; e.g., with one or more user-interface terminals installed at the item provider's facilities. Other types of item provider computing systems are also possible.

In order to provide UAV transport services to various item providers in an efficient and flexible manner, ATSP control system 401 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

The dynamic assignment of UAVs to flights for a number of different item providers can help an ATSP to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, ATSP control system 401 can dynamically redistribute UAVs amongst a number of UAV deployment locations (which may be referred to as, e.g., "hubs" or "nests") through a service area, according to time-varying levels of demand at various locations or sub-areas within the service area.

Each respective UAV nest of UAV nests 404*a-d* is shown as having associated therewith a corresponding geographic area 405*a*, 405*b*, 405*c*, and 405*d*, respectively (i.e., geographic areas 405*a-d*), within which UAVs of the respective UAV nest provide transport services to item providers and/or item recipients. The geographic area served by a given UAV nest may be defined, at least in part, by the flight range(s) of the UAVs that are located at or scheduled to be located at the given UAV nest. In some implementations, the geographic areas 405*a-d* corresponding to UAV nests 404*a-d* may each have a fixed size, which does not vary over time. In other implementations, the size of each of geographic areas 405*a-d* could vary over time based on various factors, such as demand for UAV transport services in the geographic area and/or nearby geographic areas, the number and/or capabilities of UAVs allocated to operate from the corresponding UAV nest, and/or the number and/or characteristics of item providers located near to the UAV nest, among other possibilities.

Additionally or alternatively, the size of each of geographic areas 405*a-d* could vary on an order-by-order basis, and/or vary by item provider. More specifically, when a transport task involves three or more flight legs (e.g., a flight from the UAV nest to the item provider for pick-up, a flight from the item provider to a delivery location, and a return flight to the UAV nest), there may be two or more flight legs before delivering an item. Thus, the evaluation of whether or not a given item provider is within the geographic service area of a UAV nest for a given transport task may depend on a combination of the distance from the UAV nest to the item pick-up location, the distance from the pick-up location to the delivery location, and the distance from the delivery location to the UAV nest. As a result, a given UAV nest may be able to serve a given item provider for one transport task, but not for another. In this context, it is possible that the notion of a defined "geographic service area" might not be utilized at all. Instead, ATSP control system 401 may simply evaluate whether a UAV transport task can be implemented on a task-by-task basis, given all of the parameters for completion of the task.

Since certain item providers can only be served by (or are better served by) a certain UAV nest or nests, and because demand for UAV transport services can vary between item providers, ATSP control system 401 may, for a given geographic/service area, implement an ongoing process to distribute and redistribute UAVs amongst the UAV nests 404*a-d* that collectively serve the given area. In particular, ATSP control system 401 may continually, periodically, or from time-to-time evaluate demand and/or other factors for each item provider 406*a-d*, and determine a respective number of UAVs that are desirable at each of UAV nests 404*a-d*, in order to meet the demand for UAV transport tasks in the corresponding geographic area. Additionally or alternatively, ATSP control system 401 could determine a respective number of UAVs that are desirable at each of UAV nest 404*a-d* such that UAV nests 404*a-d* can collectively meet demand for UAV transport services in the larger area collectively served by the UAV nests 404*a-d.*

Figure 5:
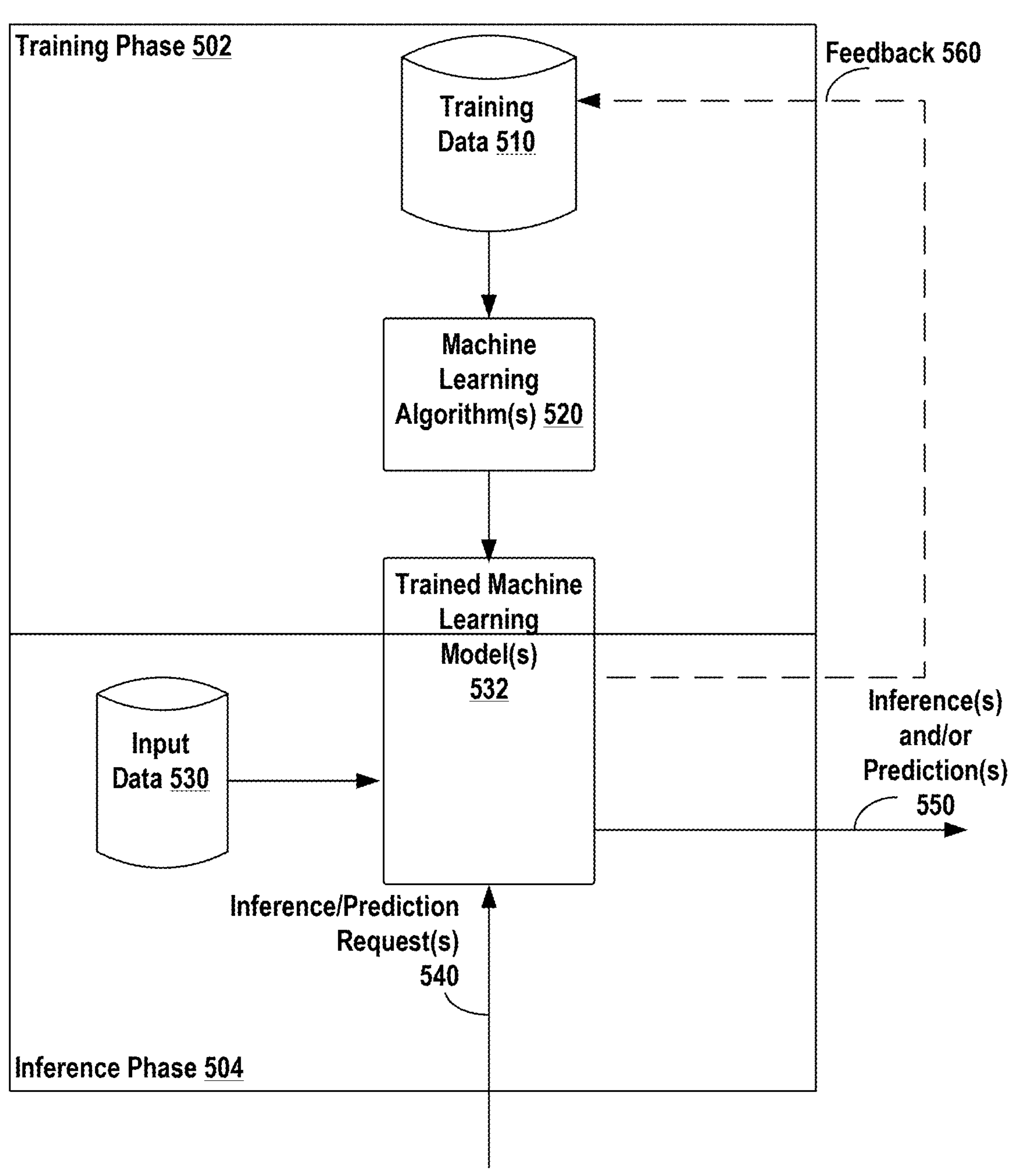
FIG. 5 is a block diagram showing aspects of a machine learning system, in accordance with example embodiments.

FIG. 5 shows diagram 500 illustrating a training phase 502 and an inference phase 504 of trained machine learning model(s) 532, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be referred to as a trained machine learning model. For example, FIG. 5 shows training phase 502 where one or more machine learning algorithms 520 are being trained on training data 510 to become trained machine learning model(s) 532. Then, during inference phase 504, trained machine learning model(s) 532 can receive input data 530 and one or more inference/prediction requests 540 (perhaps as part of input data 530) and responsively provide as an output one or more inferences and/or prediction(s) 550.

As such, trained machine learning model(s) 532 can include one or more models of one or more machine learning algorithms 520. Machine learning algorithm(s) 520 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 520 may be supervised or unsupervised, and may implement any suitable combination of online and offline learning.

In some examples, machine learning algorithm(s) 520 and/or trained machine learning model(s) 532 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 520 and/or trained machine learning model(s) 532. In some examples, trained machine learning model(s) 532 can be trained, reside and execute to provide inferences on a particular computing device, and/or otherwise can make inferences for the particular computing device.

During training phase 502, machine learning algorithm(s) 520 can be trained by providing at least training data 510 as training input using unsupervised, supervised, semi-supervised, and/or reinforcement learning techniques. Unsupervised learning involves providing a portion (or all) of training data 510 to machine learning algorithm(s) 520 and machine learning algorithm(s) 520 determining one or more output inferences based on the provided portion (or all) of training data 510. Supervised learning involves providing a portion of training data 510 to machine learning algorithm(s) 520, with machine learning algorithm(s) 520 determining one or more output inferences based on the provided portion of training data 510, and the machine learning model may be refined based on correct results associated with training data 510. In some examples, supervised learning of machine learning algorithm(s) 520 can be governed by a set of rules and/or a set of labels for the training input, and the set of rules and/or set of labels may be used to correct inferences of machine learning algorithm(s) 520.

Semi-supervised learning involves having correct results for part, but not all, of training data 510. During semi-supervised learning, supervised learning is used for a portion of training data 510 having correct results, and unsupervised learning is used for a portion of training data 510 not having correct results. Reinforcement learning involves machine learning algorithm(s) 520 receiving a reward signal regarding a prior inference, where the reward signal can be a numerical value. During reinforcement learning, machine learning algorithm(s) 520 can output an inference and receive a reward signal in response, where machine learning algorithm(s) 520 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 520 and/or trained machine learning model(s) 532 can be trained using other machine learning techniques, including but not limited to, incremental learning and curriculum learning.

In some examples, machine learning algorithm(s) 520 and/or trained machine learning model(s) 532 can use transfer learning techniques. For example, transfer learning techniques can involve trained machine learning model(s) 532 being pre-trained on one set of data and additionally trained using training data 510. More particularly, machine learning algorithm(s) 520 can be pre-trained on data from one or more computing devices and a resulting trained machine learning model provided to computing device CD1, where CD1 is intended to execute the trained machine learning model during inference phase 504. Then, during training phase 502, the pre-trained machine learning model can be additionally trained using training data 510, where training data 510 can be derived from kernel and non-kernel data of computing device CD1. This further training of the machine learning algorithm(s) 520 and/or the pre-trained machine learning model using training data 510 of CD1's data can be performed using either supervised or unsupervised learning. Once machine learning algorithm(s) 520 and/or the pre-trained machine learning model has been trained on at least training data 510, training phase 502 can be completed. The trained resulting machine learning model can be utilized as at least one of trained machine learning model(s) 532.

In particular, once training phase 502 has been completed, trained machine learning model(s) 532 can be provided to a computing device, if not already on the computing device. Inference phase 504 can begin after trained machine learning model(s) 532 are provided to computing device CD1.

During inference phase 504, trained machine learning model(s) 532 can receive input data 530 and generate and output one or more corresponding inferences and/or prediction(s) 550 about input data 530. As such, input data 530 can be used as an input to trained machine learning model(s) 532 for providing corresponding inference(s) and/or prediction(s) 550 to kernel components and non-kernel components. For example, trained machine learning model(s) 532 can generate inference(s) and/or prediction(s) 550 in response to one or more inference/prediction requests 540. In some examples, trained machine learning model(s) 532 can be executed by a portion of other software. For example, trained machine learning model(s) 532 can be executed by an inference or prediction daemon to be readily available to provide inferences and/or predictions upon request. Input data 530 can include data from computing device CD1 executing trained machine learning model(s) 532 and/or input data from one or more computing devices other than CD1.

Input data 530 can include training data described herein. Other types of input data are possible as well.

Inference(s) and/or prediction(s) 550 can include task outputs, numerical values, and/or other output data produced by trained machine learning model(s) 532 operating on input data 530 (and training data 510). In some examples, trained machine learning model(s) 532 can use output inference(s) and/or prediction(s) 550 as input feedback 560. Trained machine learning model(s) 532 can also rely on past inferences as inputs for generating new inferences.

After training, the trained version of the neural network can be an example of trained machine learning model(s) 532. In this approach, an example of the one or more inference/prediction request(s) 540 can be a request to predict a classification for an input training example and a corresponding example of inferences and/or prediction(s) 550 can be a predicted classification output.

III. EXAMPLE SYSTEMS AND METHODS

Figure 6:
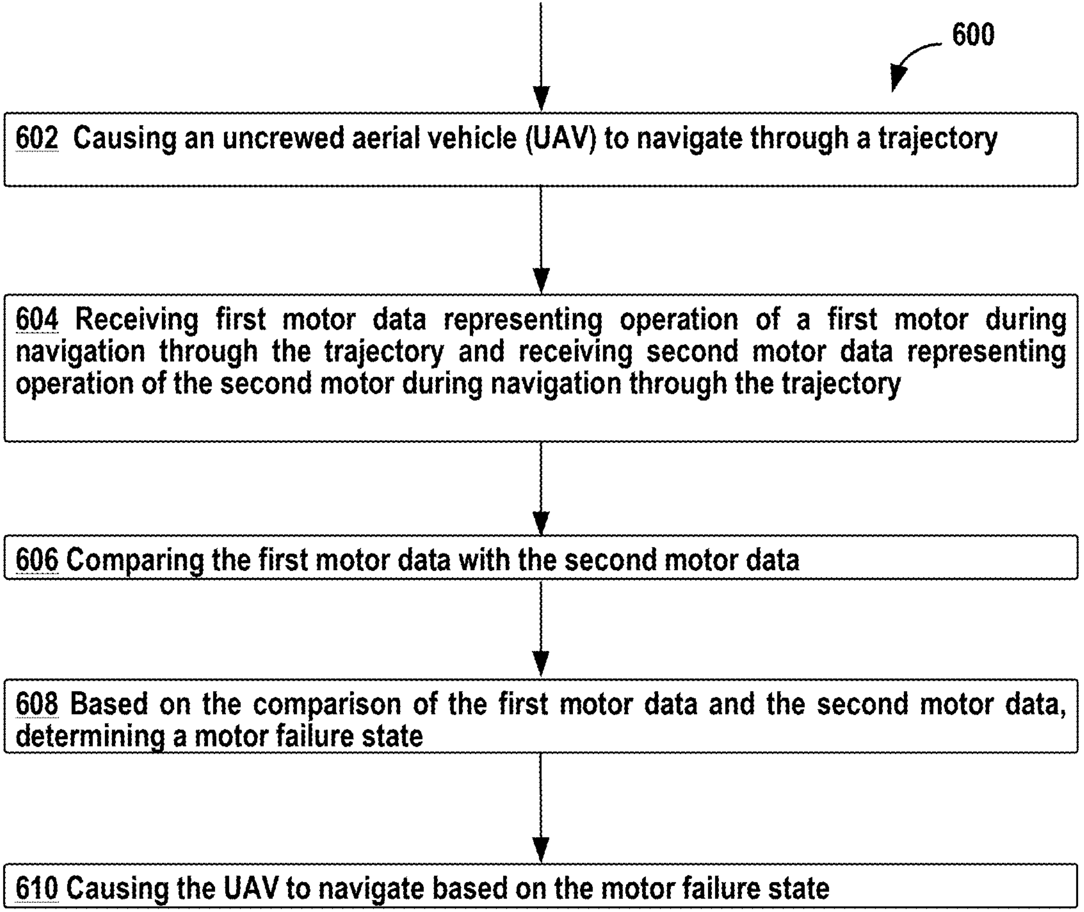
FIG. 6 is a block diagram of a method, in accordance with example embodiments.

FIG. 6 is a block diagram of a method, in accordance with example embodiments. Method 600 may be carried out by one or more processors (e.g., by executing program instructions stored in a data storage). Execution of method 600 may involve a UAV, such as the UAVs illustrated and described with respect to FIGS. 1A-3. Other UAVs may also be used in the performance of method 600. In further examples, some or all of the blocks of method 600 may be performed by a control system remote from the UAV. In yet further examples, different blocks of method 600 may be performed by different control systems, located on and/or remote from a UAV.

At block 602, method 600 includes causing a UAV to navigate through a trajectory. The trajectory may be a predetermined trajectory. For example, the trajectory may have a corresponding shape and/or pattern (e.g., triangle, rectangle, octagon, sine wave, etc.), and/or may include maneuvering up and down (e.g., from one altitude to another different altitude) and/or maneuvering side to side, among other examples. A computing system may cause the UAV to fly through (or at least attempt to fly through) the predetermined trajectory by sending a control signal to the UAV, where the control signal has a predetermined profile. The predetermined trajectory may be associated with expected motor data and/or expected comparisons/relationships between motor data. The computing system may direct the UAV to navigate through the trajectory before a missing, as part of the mission, and/or after completing the missions to assess motor health and possibly to determine whether the UAV can complete the mission or a subsequent mission.

Figure 7:
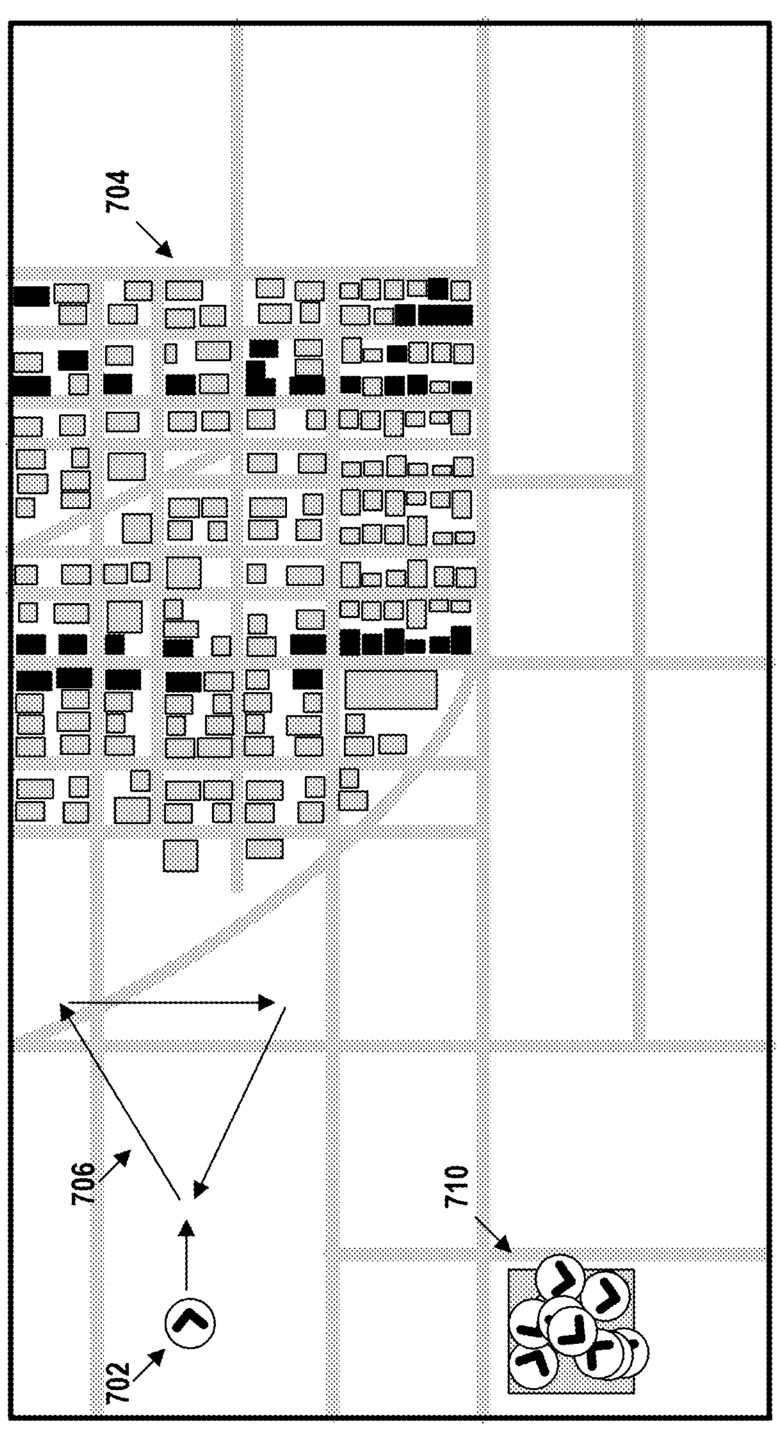
FIG. 7 depicts a map of an environment, in accordance with example embodiments.

FIG. 7 depicts map 700 of an environment, in accordance with example embodiments. Map 700 includes UAV 702, which may have departed from takeoff location 710 (which may be referred to herein as a "nest"). UAV 702 may be tasked with a mission to deliver a payload to area 704. While UAV 702 is navigating towards area 704 to complete the mission, the computing system may detect an abnormality or irregularity in sensor data being received from sensors on UAV 702, which may trigger method 600 as described herein. Additionally and/or alternatively, while UAV 702 is navigating towards area 704 to complete the mission, the computing system may periodically trigger method 600 as described herein as a way to monitor the health of the motors on UAV 702. Thus, in some cases, a flight trajectory associated with performing a mission by UAV 702 may be modified to insert thereinto the trajectory used for monitoring the health of the motors of the UAV. The motors described herein may include various types of motors, including servo motors and hover motors.

For example, triggering the method 600 as described herein may involve determining whether sensor data obtained during flight procedures indicates any irregularities. Examples of sensor data that the computing system may receive and analyze include gyroscope data, accelerometer data, IMU data, and/or GPS data, among other examples. The computing system may determine whether the received sensor data matches, is similar to, and/or corresponds to expected sensor data. For example, the computing system may receive gyroscope data from UAV 702. If the computing system directs the UAV 702 to fly parallel to the ground and the computing system receives gyroscope data indicating that UAV 702 is not flying parallel to the ground (e.g., is flying with a substantial perpendicular component relative to the ground), the computing system may determine that UAV 702 is flying irregularly and the computing system may trigger the method 600 as described herein.

After triggering method 600, the computing system may direct or otherwise cause UAV 702 to fly in a trajectory to test one or more components of the UAV. The trajectory may be a predetermined trajectory or a dynamically determined trajectory. The computing system may cause UAV 702 to fly in this trajectory to determine whether a motor on the UAV is likely to fail or has failed. Sensor data received while UAV 702 is flying through the trajectory may be at least partially predictable (e.g., based on prior flights and/or models of the UAVs operation), such that the computing system may be able to accurately determine whether a motor on the UAV has failed.

In some examples, the computing system may cause UAV 702 to fly through predetermined trajectory 706, which may be in the shape of a triangle. Predetermined trajectories may also include other paths, shapes, and/or patterns, including trajectories in the shape of a sine wave, trajectories composed of and/or based on a plurality of shapes (e.g., triangles, quadrilaterals, hexagons, pentagons, etc.), and/or linear paths of various distances, among other examples. The predetermined trajectory may be selected from a list of trajectories. In some examples, the trajectory may be selected based on which motor on UAV 702 is suspected to be likely to fail and/or has already failed. For example, the computing system may determine that a motor on a particular side of UAV 702 is likely to have failed, and the motor may have a counterpart motor located symmetrically on UAV 702, where the motor and the counterpart motor may operate similarly when the UAV navigates through certain paths. The computing system may thus cause UAV 702 to fly in a predetermined path associated with operating symmetrically located motors similarly.

As another example, the computing system may cause UAV 702 to navigate through a dynamic trajectory, which the computing system may determine based on sensor data received from UAV 702. Since sensor data from UAV 702 may indicate irregularities in the flight pattern of UAV 702, the computing system may determine a trajectory that is specific to and/or useful for determining which motor on UAV 702 is failing.

Referring back to FIG. 6, at block 604, method 600 includes receiving the first motor data representing operation of a first motor during navigation through the trajectory and receiving second motor data representing operation of a second motor during navigation through the trajectory. The first motor data and the second motor data may include various sensor data, including data received from the motor itself, sensors associated with the motor, and/or from components affected by operations of the motors.

The motor data may quantify electrical properties of the corresponding motor. As one example, the first motor data and the second motor data may include current drawn by the first motor and the second motor, respectively. The computing system may determine the current drawn by the first motor and the second motor based on the current that the first and second motor draw through and/or using the computing system and/or components controlled by the computing system. As another example, the motor data may include a voltage at which the corresponding motor is operated, a power drawn by the corresponding motor, a counter-electromotive force generated by the corresponding motor, inductive properties of the corresponding motor, capacitive properties of the corresponding motor, and/or time periods to which these quantities correspond, among other possibilities.

Additionally or alternatively, the motor data may quantify mechanical properties of the corresponding motor and/or UAV 702. As one example, the computing system may also receive a frequency and/or an angular speed at which the first motor and/or the second motors are operating (e.g., from motor encoder(s)). As another example, the computing system may receive sensor data that represents, for example, an orientation of the UAV, a distance traveled by of the UAV (e.g., air displacement and/or ground displacement), a speed of the UAV (e.g., air speed and/or ground speed), an acceleration of the UAV (e.g., air acceleration and/or ground acceleration), and/or forces(s) exerted and/or experienced by the UAV (e.g., vibrations), among other possibilities.

Figure 8:
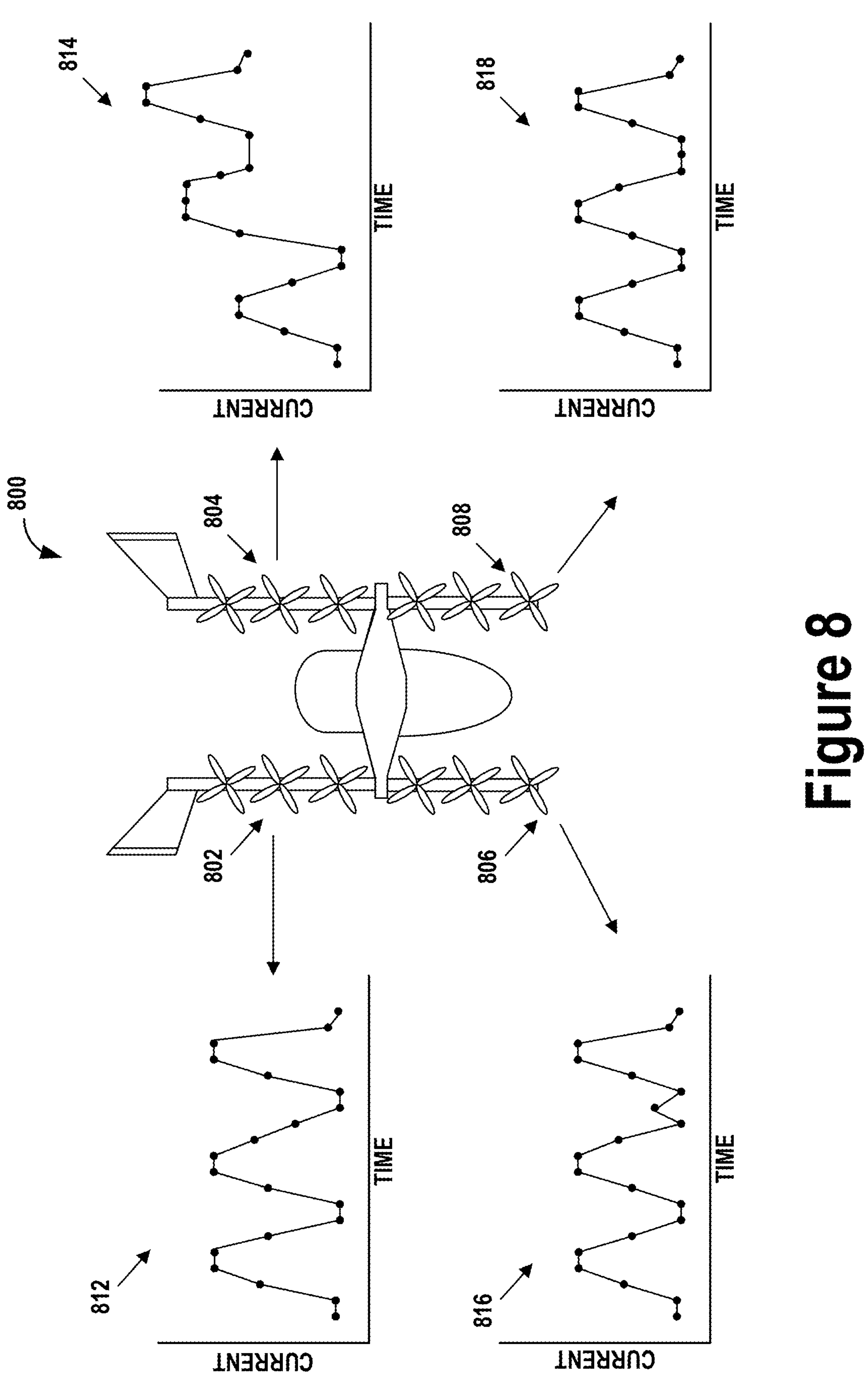
FIG. 8 is a diagram of a UAV and example motor data, in accordance with example embodiments.

FIG. 8 is a diagram of UAV 800 and example motor data generated thereby. UAV 800 may include motors 802, 804, 806, and 808. Each of motors 802, 804, 806, and 808 may control a propeller of UAV 800, as shown. UAV 800 may also include one or more additional motors and associated propellers. The computing system may direct motors 802, 804, 806, and 808 (and the one or more additional motors) on UAV 800 to spin, which may cause the associated propellers to spin and cause UAV 800 to fly and navigate along various trajectories.

As mentioned above, to facilitate determining whether a motor of UAV 800 has failed, the computing system may cause UAV 800 to navigate along a particular trajectory, and the computing system may receive motor data while UAV 800 is navigating along the trajectory. For example, while navigating through trajectory 706 of FIG. 7, the computing system may receive motor data 812 from motor 802, motor data 814 from motor 804, motor data 816 from motor 806, motor data 818 from motor 808. The computing system may also receive data from other motors on UAV 800.

Motor data 812, 814, 816, and 818 may represent a current draw of motors 802, 804, 806, and 808, respectively, possibly while UAV 800 is navigating through a trajectory (e.g., trajectory 706 of FIG. 7). Motor data 812, 814, 816, and 818 as illustrated in FIG. 8 provides one example of motor data, and thus the motor data may include other types of data as mentioned above.

As mentioned above and as shown in FIG. 8, motors of UAV 800 may have a particular physical arrangement of UAV 800 to facilitate UAV navigation. In particular, UAV 800 may have a symmetrical arrangement of motors, such that motors on either side of UAV 800 are controlled similarly. For example, motor 802 may be controlled similarly to motor 804 and motor 806 may be controlled similarly as motor 808. As such, motor data may be expected to be the same or similar among motors that are controlled similarly during normal operations (e.g., when none of the motors of UAV 800 including motors 802, 804, 806, and 808 have failed). For example, motor data 812 of motor 802 may be expected to be similar to motor data 804 of motor 804 when motors 802 and 804 are controlled similarly, and motor data 816 of motor 806 may be expected to be similar to motor data 818 of motor 808 when motors 806 and 808 are controlled similarly.

Additionally and/or alternatively, motors that are not located symmetrically on UAV 800 may be controlled differently to affect UAV navigation trajectory, and motor data may be expected to be different among motors that are controlled differently. For example, motor 802 may be controlled differently than motor 806, and motor 804 may be controlled differently than motor 808. Accordingly, the computing system may predict and/or expect that, during normal operations, motor data 812 from motor 802 may be different from motor data 816 from motor 806 and that motor data 804 of motor 804 may be different from motor data 818 of motor 808.

Referring back to FIG. 6, at block 606, method 600 includes comparing the first motor data with the second motor data. In particular, the computing system may compare motor data from two or more motors when the computing system is configured to predict and/or expect that the motor data from the two or more motors is to be similar, and/or when the computing system predicts and/or expects that the motor data from the two or more motors is to be different.

Figure 9:
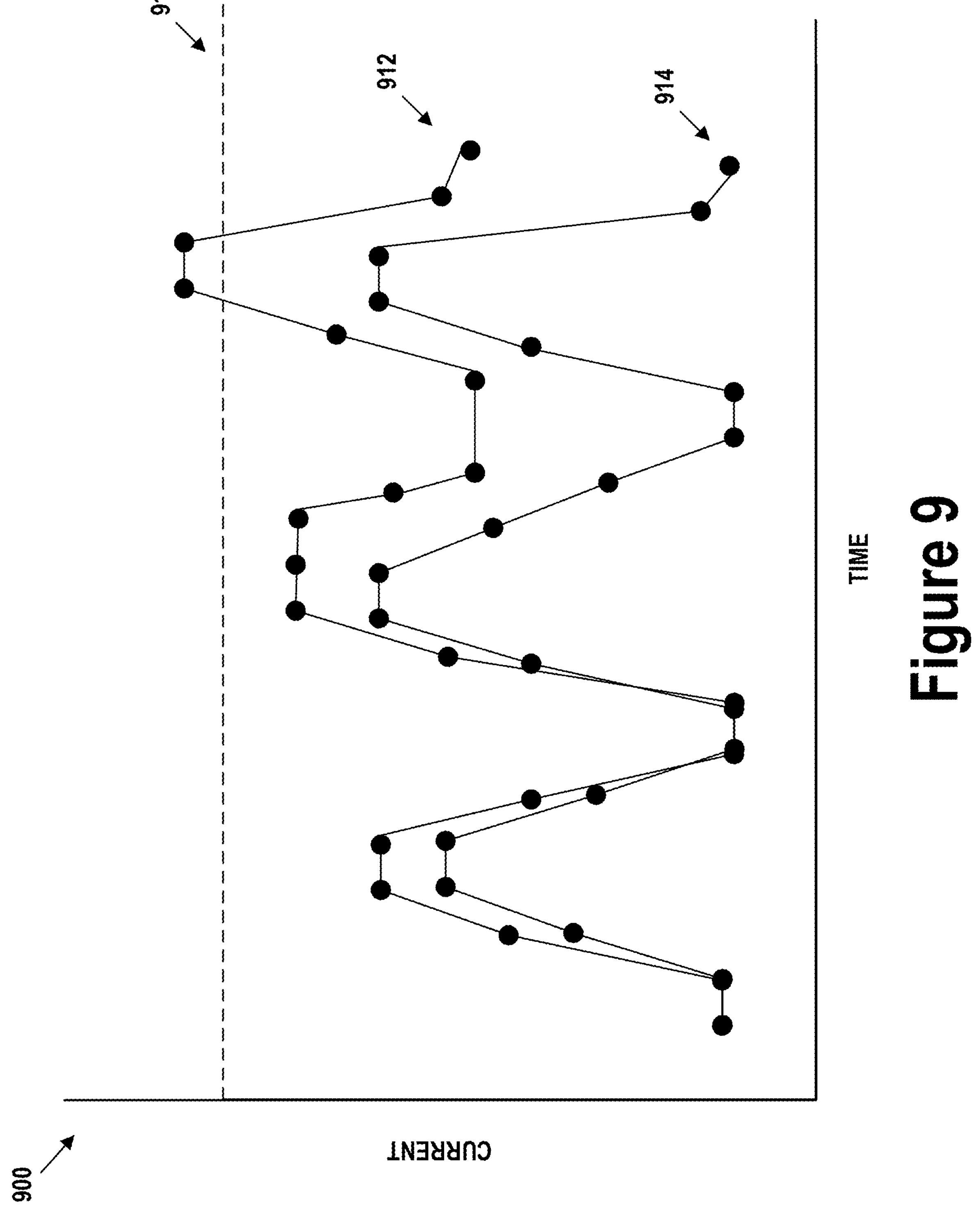
FIG. 9 is a comparison of example motor data, in accordance with example embodiments.

FIG. 9 depicts plot 900 of comparison of example motor data. Plot 900 includes motor data 912 and motor data 914. Motor data 912 and motor data 914 may be collected by, respectively, motor 802 and motor 804 of UAV 800 from FIG. 8. As mentioned above, since motor 802 and motor 804 are located symmetrically across the UAV, the computing system may be configured to predict and/or expect that motor data 912 and motor data 914 are to be similar to each other when motors 802 and 804 are operated and/or controlled in a similar manner.

The computing system may compare motor data 912 and motor data 914 using various methods to determine whether one or more of motors 802 and/or 804 has failed. For example, the computing system may compare motor data 912 and motor data 914 against threshold value 910 to determine whether one or more of motors 802 and 804 has failed. Additionally or alternatively, the computing system may determine a difference in the motor data (e.g., a difference in current for each point in time), and the computing system may compare the difference with a threshold value. If the difference is above the threshold value, the computing system may determine that a motor has failed and, if the difference is below the threshold value, the computing system may determine that the motor has not failed. In some examples, the computing system may also determine whether the amount of time for which the motor data and/or the difference exceeds the threshold value, and determine that the motor has failed if the amount of time exceeds a threshold amount of time.

When a motor fails, the motor may draw additional current compared to a motor that has not failed. Accordingly, the computing system may determine whether a motor has failed based on comparing the motor data (e.g., motor data 912 and motor data 914) and determine whether one motor data indicates current draw that is consistently and/or significantly higher than the current draw indicated by another motor data. Additionally or alternatively, the computing system may compare the motor data with a predetermined current threshold. If one or more data points of the motor data is above the predetermined current threshold, the computing system may determine that the motor has failed.

In some examples, the computing system may determine whether motor data 912 exhibits a threshold extent of similarity with motor data 914. For example, the computing system may determine whether one or more data points of motor data 912 are the same as or within a threshold extent of one or more corresponding (e.g., temporally-aligned) data points of motor data 914. To determine a similarity value, the computing system may determine a ratio of (i) how many data points of motor data 912 are within the threshold extent of the corresponding one or more data points of motor data 914 to (ii) a total number of data points. The similarity value may be compared with the threshold extent of similarity. Additionally or alternatively, the computing system may calculate a distance between motor data 912 and motor data 914 (e.g., an integral of difference values between samples of motor data 912 and motor data 914) to determine the similarity value, which may be compared with the threshold extent of similarity.

As another example, the computing system may compare motor data 912 and motor data 914 and determine whether the comparison matches an expected difference pattern. For example, the computing system may expect one motor to draw less current than another motor when navigating through a particular trajectory. The computing system may compare motor data 912 and motor data 914 and determine whether the motor data associated with the motor expected to draw less current actually draws less current than the other motor. The expected difference pattern may be based on, for example, sensor data obtained from properly-functioning motors when flying the trajectory using a properly-functioning UAV. For example, the computing system may include a database of flight trajectories and corresponding motor data patterns expected to be observed in connection therewith. A given flight trajectory in the database may be associated with (i) one or more error-free motor data patterns for one or more motors of the UAV and/or (ii) one or more motor data patterns indicative of one or more failures of the one or more motors of the UAV.

In addition, the computing system may compare motor data 912 and/or motor data 914 to historical motor data. For example, the computing system may receive historical motor data from the same motor (or the same type of motor) as motor data 912 (i.e., motor 802 of UAV 800) and the computing system may receive historical motor data from the same motor (or the same type of motor) as motor data 914 (i.e., motor 804 of UAV 800). The computing system may compare the historical motor data associated with motor data 912 and the historical motor data associated with motor data 914 to determine whether the historical motor data matches or whether the historical motor data does not match. The historical motor data may represent a normal operation of the associated motors on the UAV (e.g., that the associated motors on the UAV have not failed). Accordingly, the computing system may determine whether motors on the UAV failed or not based on whether a comparison between motor data collected from two different motors matches the comparison of historical motor data.

Additionally and/or alternatively, the computing system may determine whether motors on the UAV failed or not based on whether the comparison between motor data collected from the two different motors are within a threshold extent of a comparison of the historical motor data. In particular, historical motor data associated with motor data 912 and historical motor data associated with motor data 914 may be compared, and the computing system may determine one or more historical comparison measures. Motor data 912 and motor data 914 may also be compared to determine one or more comparison measures. The computing system may compare the historical comparison measures with the comparison measures to determine whether the comparison measures are within a threshold extent of the historical comparison measures. If the computing system determines that the comparison measures are within the threshold extent of the historical comparison measures, the computing system may determine that neither the motor associated with motor data 912 nor the motor associated with motor data 914 have failed. Otherwise, the computing system may determine that one of the motors associated with motor data 912 or motor data 914 has failed.

In some examples, the first motor data and the second motor data may include a time associated with how long the respective motor associated with the motor data takes to accelerate and/or decelerate from a first speed to a second speed. The first speed and second speed may be different. When a motor fails, the time the motor takes to accelerate and/or decelerate from the first speed to the second speed may be more than a motor that has not failed. Accordingly, the computing system may determine whether a motor has failed based on whether the time the motor takes to accelerate and/or decelerate from the first speed to the second speed is greater than the time another motor takes to accelerate and/to decelerate from the first speed to the second speed. The first speed and second speed may correspond to angular frequencies at which the motors spin.

In some examples, older and/or more used motors may be more likely to fail than newer and/or less used motors. Accordingly, the computing system may, when comparing the motor data, account for the age of the respective motor. The age may be measured chronologically (e.g., length of time since the motor was manufactured and/or installed on an aerial vehicle) and/or in terms of a number of flight hours (e.g., how long the motor was turned on), among other possibilities. As one example, the computing system may select the first motor based on the first motor having a lower age than the second motor, thus allowing any degradation in performance of the second motor to be identified by identifying differences in operation of the older motor (which is more likely to enter motor failure state(s)) relative to operation of the younger motor (which is less likely to enter a motor failure state(s)). As another example, the computing system may select two motors that have approximately the same age (e.g., motors with respective ages within a threshold age of one another), thus allowing the comparison to ignore normal (e.g., non-failure) effects of motor aging.

In some cases, thresholds applied in connection with comparing the first motor data and the second motor data may be based on the motor age. For example, motor data obtained from an older motor may be permitted to deviate from, for example, historical motor data by a greater extent than motor data obtained from a younger motor.

Referring back to FIG. 6, at block 608, method 600 includes, based on the comparison of the first motor data and the second motor data, determining a motor failure state. In particular, the computing system may determine whether one of the motors on the UAV failed (e.g., the first motor or the second motor), or the computing system may identify which of the motors on the UAV has failed.

Figure 10:
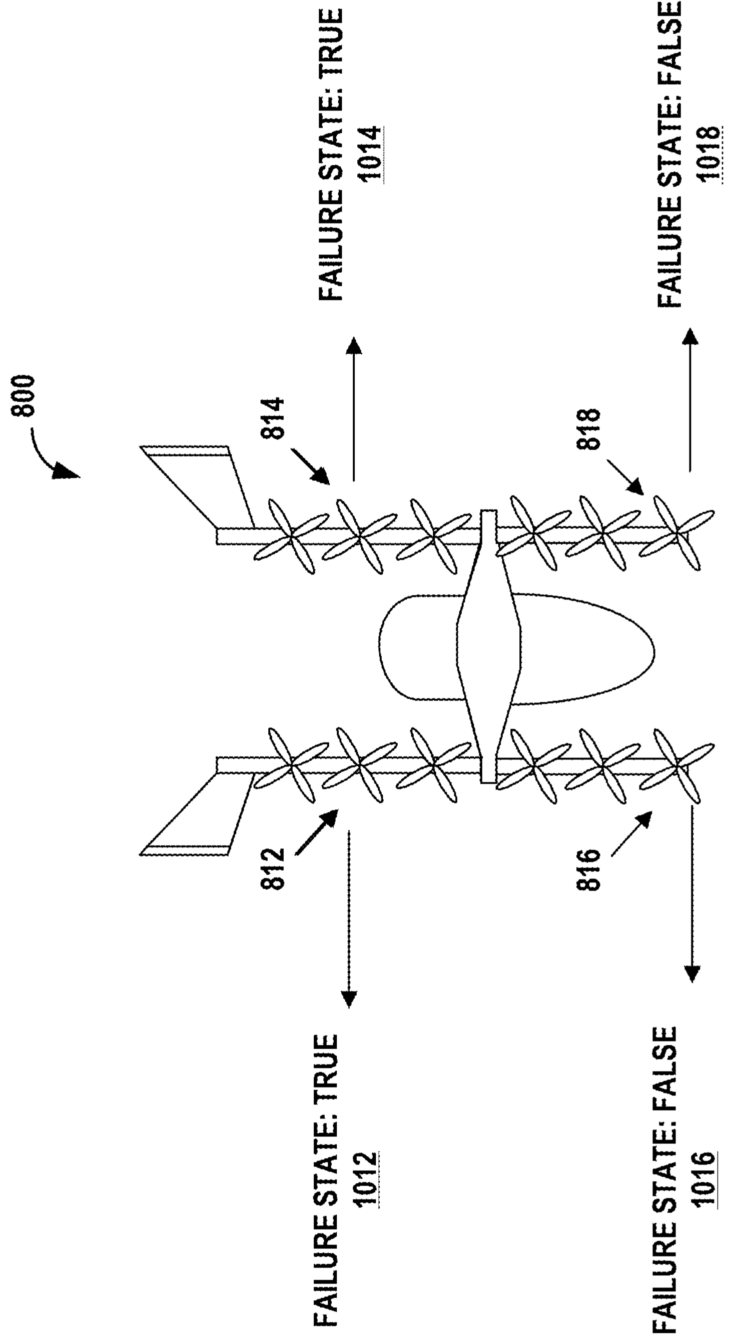
FIG. 10 is a diagram of a UAV and example failure states, in accordance with example embodiments.

FIG. 10 is a diagram of UAV 800 and example failure states, in accordance with example embodiments. Based on the comparison of the data in FIG. 8, the computing system may determine failure state 1012 corresponding to motor 802, failure state 1014 corresponding to motor 804, failure state 1016 corresponding to motor 806, and failure state 1018 corresponding to motor 808. A failure state may indicate that a corresponding motor has not failed, has partially failed, has completely failed, and/or a type of the failure.

As mentioned above, in some cases, the computing system may compare motors that are symmetrical to each other, and the comparison may be expected to indicate that, absent motor failure, the motor data output by the respective motors matches (e.g., does not differ by more than a threshold value/extent) when flying particular trajectories and/or performing particular maneuvers that use these motors in the same or similar manner. Thus, when this comparison indicates that the motor data does not match, the computing system may determine a failure state of one or more of the motors. For example, the computing system may compare the motor data output by motor 802 and the motor data output by motor 804, and the computing system may determine that the motor data does not match (e.g., the two instances of motor data differ by more than the threshold extent/value). Additionally or alternatively, the computing system may determine that the motor data of motor 802 does not match the expected behavior of motor 802 and/or the motor data of motor 804 does not match the expected behavior of motor 804.

Accordingly, the computing system may determine that one of motors 802 and 804 must have failed, and the computing system may set motor failure state 1012 of motor 802 to "TRUE" and motor failure state 1014 of motor 804 to "TRUE," as shown in FIG. 10. As another example, the computing system may determine that a comparison of motor data collected from motor 806 and motor data collected from motor 808 matches, which may match the expected prediction of the motor data of motor 806 matching with the motor data of motor 808. Accordingly, the computing system may set a failure state 1016 of motor 806 indicating that motor 806 is determined to not have failed (e.g., "FALSE"). The computing system may similarly set failure state 1018 indicating that motor 808 is determined to not have failed.

In some examples, the computing system may determine which motor is likely to have failed. For example, taking the motor data of motor 802 and the motor data of motor 804 as an example (as shown by motor data 912 and motor data 914 respectively), the computing system may determine that motor data 912 corresponding to motor 802 includes one or more points above a threshold value in addition to not matching with the motor data of motor 804. Accordingly, the computing system may determine that motor 802 is likely to have failed or otherwise is in need of maintenance, and the computing system may set the corresponding failure state 1012 of motor 802 to "TRUE," as shown in FIG. 10. The computing system may determine that motor 804 is unlikely to have failed, and the computing system may set the corresponding failure state 1014 of motor 804 to "FALSE."

In some implementations, failure states 1012, 1014, 1016, and/or 1018 may additionally or alternatively represent motor failure states using categorical values that represent a type of the detected motor failure state. For example, each of motors 812, 814, 816, and 818 may experience a plurality of types of motor failure states (e.g., 1 normal state, and 10 different types of potential problems), and failure states 1012, 1014, 1016, and/or 1018 may thus use the categorical values to indicate which type of motor failure the corresponding motor is experiencing (e.g., "Failure State: NONE," "Failure State: F1," "Failure State: F2," and so on through "Failure State: F10"). In some implementations, each respective type of the plurality of types of motor failure states may be detected using a corresponding flight trajectory and/or flight maneuver that, if the motor failure state is not present, is expected to be executed successfully and, if the motor failure is present, is expected to be executed deficiently and/or unsuccessfully. Thus, when a particular type of failure state is expected and/or suspected, the computing system may select and cause the UAV to perform the corresponding flight trajectory and/or flight maneuver associated with detection of the particular type of failure.

In some implementations, failure states 1012, 1014, 1016, and/or 1018 may additionally or alternatively represent motor failure states using numerical values that represent a likelihood and/or severity of the detected motor failure state. For example, the likelihood and/or severity of a given type of motor failure state of each of motors 812, 814, 816, and 818 may be represented using a predetermined range of values (e.g., 0-100, with 0 indicating a lowest likelihood and/or severity, and 100 indicating a highest likelihood and/or severity), and failure states 1012, 1014, 1016, and/or 1018 may thus use the numerical values to quantify the likelihood and/or severity (e.g., "Failure State: F1; Likelihood: L1; Severity: S1" "Failure State: F2; Likelihood: L2; Severity: S2" and so on through "Failure State: F10; Likelihood: L10; Severity: S10"). The likelihood and/or severity may be determined based on the extent to which the motor data of a corresponding motor differs from the motor data of another motor and/or expected motor data of the corresponding motor, among other possibilities. Thus, the likelihood and/or severity may quantitatively represent a divergence of the corresponding motor from normal operation.

In some examples, the computing system may be configured to use a machine learning (ML) model to determine a failure state of a motor. The ML model may be trained to determine, based at least on motor data from a particular motor, one or more output values that represent (i) a likelihood of the particular motor experiencing a motor failure state, (ii) a confidence that the particular motor is experiencing the motor failure state, and/or (iii) a severity of the motor failure state experienced by the motor. The one or more output values may represent and/or correspond to one or more categories/types of motor failures. Thus, the ML model may be configured to predict whether a motor has failed and/or which motor has failed.

In some implementations, the ML model may be configured to determine the one or more output values based on processing the first motor data and the second motor data. For example, the ML model may be configured to compare at least the first motor data and the second motor data. The ML model may be configured to generate the one or more output values for the first motor, while using the second motor data as a reference to represent normal motor operation relative to which potential failures may be identified. In some implementations, the ML model may be configured to determine the one or more output values based on processing the first motor data and historical motor data associated with the first motor.

In some implementations, the machine learning model may be configured to additionally process a first control signal provided to the first motor and/or a second control signal provided to the second motor. The first control signal may be associated with (e.g., may cause) behavior of the first motor that results in the first motor data, and the second control signal may be associated with (e.g., may cause) the behavior of the second motor that results in the second motor data. Thus, the machine learning model may be configured to determine the likelihood, confidence, and/or severity of one or more potential motor failure states based on differences between commanded motor performance (as represented using the motor control signals) and observed motor behavior (as represented using the motor data).

In some implementations, the machine learning model may be configured to additionally or alternatively process a representation of the flight maneuver being performed by UAV 702. The representation of the flight maneuver may be represented using categorical values and/or a numerical representation of the trajectory associated with the flight maneuver, among other possibilities. The representation of the flight maneuver may indicate to the ML model an expected behavior of the motor(s) in connection with the flight maneuver, and thus expected pattern(s) in corresponding motor data.

In some implementations, the machine learning model may be configured to additionally and/or alternatively process data that represents a position of the motor on UAV 702. The position of the motor on UAV 702 may be represented explicitly using, for example, coordinates of the motor relative to a reference frame of UAV 702 (e.g., center of mass of UAV 702), and/or implicitly using, for example, an identifier of the motor (e.g., motor 3 of 9, which corresponds to a predetermined location on UAV 702). The position of the motor on UAV 702 may indicate to the ML model an expected behavior of the motor in connection with the flight trajectory and/or flight maneuver being performed by UAV 702, and thus expected pattern(s) in corresponding motor data.

The ML model may be trained by the computing system using training samples collected from a plurality of motors, UAVs, flight trajectories, and/or flight maneuvers, among other possibilities. Each respective training sample of the plurality of training samples may include at least (i) training motor data obtained from a training motor and (ii) one or more ground-truth data indicating a failure state of the training motor (e.g., represented as a likelihood, confidence, and/or severity). In some cases, each respective training sample may also indicate a position of the training motor on a corresponding UAV, the flight trajectory and/or flight maneuver represented by the respective training sample, a training control signal provided to the training motor, and/or any of the other types of inputs discussed above. The ML model may correspond to trained machine learning model(s) 532 of FIG. 5.

Referring back to FIG. 6, at block 610, method 600 includes causing the UAV to navigate based on the motor failure state. The computing system may store a plurality of contingency operations, and based on the motor failure state, the computing system may select a contingency operation based on the motor failure state or the motor failure states of the UAV.

Figure 11:
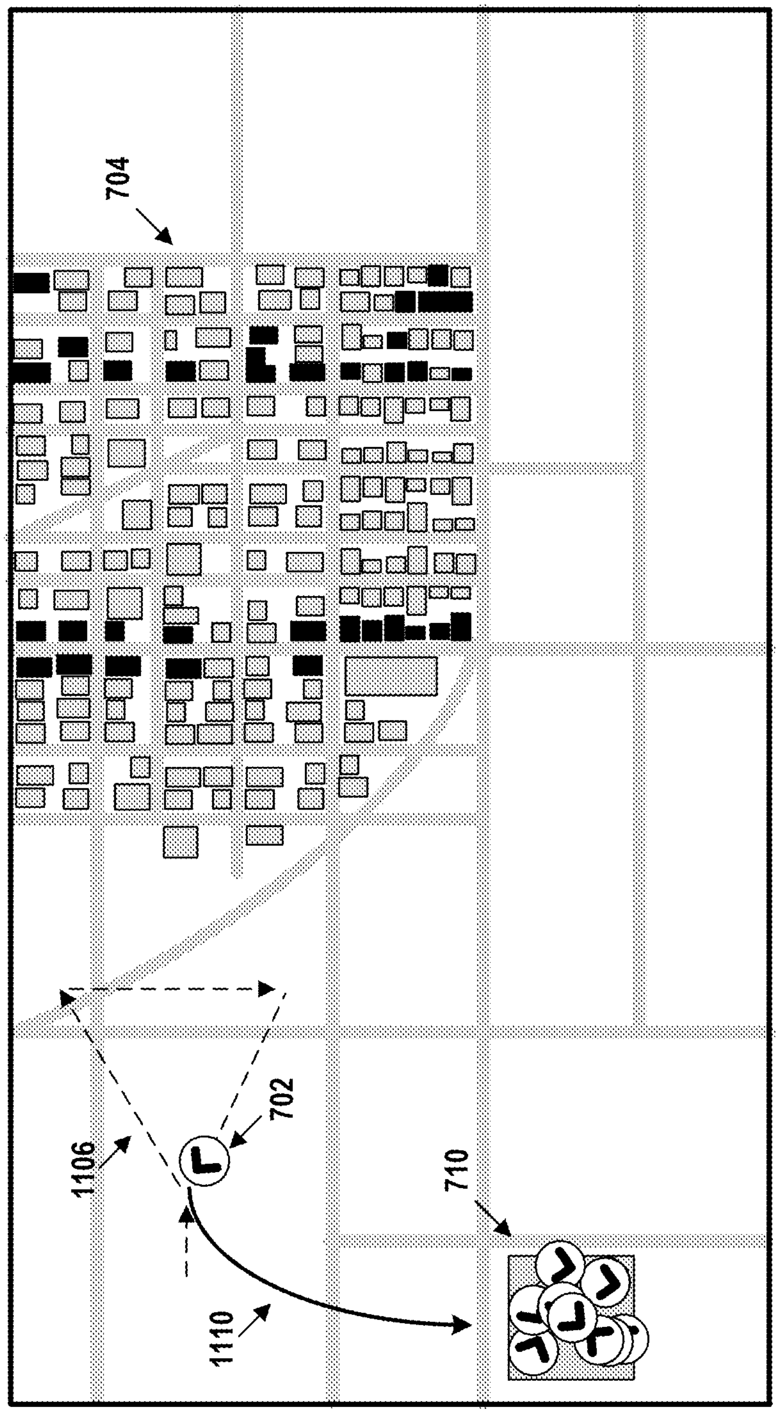
FIG. 11 depicts a map of an environment, in accordance with example embodiments.

FIG. 11 depicts map 700 of an environment, in accordance with example embodiments. Map 700 depicts UAV 702. The computing system may have directed UAV 702 to navigate through trajectory 1106, perhaps to determine whether motors on UAV 702 are in need of maintenance. If one or more motors of UAV 702 have an associated failure state indicating that the motor likely has failed, the computing system may carry out a contingency operation associated with one or more motors on the UAV failing. For example, the computing system may cause UAV 702 to navigate through trajectory 1110 to return back to nest 710 or other landing location. If all the motors have an associated failure state indicating that the motor likely has not failed, the computing system might not carry out a contingency operation. For example, the computing system may cause UAV 702 to continue in conducting its mission of delivering a payload to area 704.

In some examples, the contingency operation may be selected to verify the determination of the motor failure state. For example, the computing system may direct UAV 702 to re-navigate through trajectory 1106 to confirm that one or more motors of the UAV 702 have failed, or to confirm that the one or more motors of UAV 702 have not failed. In some cases, the contingency operation may involve verifying the determination of the motor failure state by causing UAV 702 to navigate through a different trajectory and/or perform different maneuvers selected to utilize the one or more motors in a manner that allows the motor failure state to be quantified more accurately. For example, the possibility of a particular type of motor failure may be initially detected during normal operation of UAV 702 (e.g., while UAV 702 is transporting a payload to a destination). Based on detecting the possibility of the particular type of motor failure, the computing system may cause UAV 702 to follow a flight trajectory and/or perform a flight maneuver that is configured to specifically test for the particular type of motor failure. Data obtained while following the flight trajectory and/or performing the flight maneuver may thus confirm or disconfirm the initial detection of the particular type of motor failure.

In some implementations, any of the operations discussed herein may be performed with respect to a first motor of a first UAV and a second motor of a second UAV (rather than the second motor of the first UAV). The first UAV and the second UAV may both be of a same UAV type, and may thus include the same or similar components and/or arrangements thereof. Thus, both UAVs may be expected to perform similarly when executing a particular flight trajectory and/or flight maneuver. Accordingly, when the second motor of the second UAV is determined and/or known to operate normally, the first motor of the first UAV may be benchmarked against the second motor in order to identify potential failure state of the first motor. For example, navigating through the trajectory may involve providing substantially and/or exactly the same command to both the first motor of the first UAV and the second motor of the second UAV. First motor data obtained from the first motor of the first UAV (which is being tested for failure states) and compared to second motor data obtained from the second motor of the second UAV (which is expected, known, and/or determined to operate failure-free) to determine whether the first motor of the UAV is experiencing any failure states.

In some cases, the first motor of the first UAV may be benchmarked against a plurality of motors of a plurality of UAVs of the same type as the first UAV. Thus, a motor may be determined to have entered a failure state when its motor data deviates from fleet-wide motor data that represents healthy/normal motor operation of other UAVs of the same type in a UAV fleet. The fleet-wide motor data may represent, for example, an average of the motor data collected from the plurality of UAVs in connection with navigating through the trajectory. In some cases, outliers likely to be associated with motor failure states may be removed from the fleet-wide motor data prior to determining the average.

Referring back to FIG. 6, in some examples, method 600 further comprises receiving an indication of at least one motor anomaly. The UAV may be caused to navigate through the trajectory based on and/or in response to receiving the indication of the at least one motor anomaly. The motor anomaly may include, for example, a particular pattern of sensor data that suggests the potential of a motor failure of a particular type. Thus, the trajectory and/or a flight maneuver that forms part of the trajectory may be selected to test for the motor failure of the particular type.

In some examples, the trajectory may be a predetermined trajectory. Causing the UAV to navigate through the predetermined trajectory may include driving each of the first motor and the second motor with a control signal having a predetermined profile. For example, the profile may include a square wave, a triangle wave, a sinusoidal wave, and/or another profile. The predetermined profile may be configured to progress the motor through a plurality of operating states and/or regimes to determine whether the motor fails to behave as expected based on and/or in response to certain control signal patterns.

In some examples, the trajectory may be a predetermined trajectory. Navigating through the predetermined trajectory may be associated with expected performance of the first motor being similar to expected performance of the second motor when navigating through the predetermined trajectory. Determining the motor failure state may include determining that the first motor data does not exhibit at least a threshold extent of similarity to the second motor data. Causing the UAV to navigate based on the motor failure state may include causing the UAV to navigate to perform a contingency operation based on determining that the first motor data does not exhibit at least the threshold extent of similarity to the second motor data.

In some examples, the trajectory may be a predetermined trajectory. Navigating through the predetermined trajectory may be associated with the expected performance of the first motor being different from the expected performance of the second motor when navigating through the predetermined trajectory. Determining the motor failure state may include determining that the first motor data does not differ from the second motor data by at least a threshold difference value. Causing the UAV to navigate based on the motor failure state may include causing the UAV to navigate to perform a contingency operation based on the motor failure state indicating that the first motor data does not differ from the second motor data by at least the threshold difference value.

In some examples, navigating through the predetermined trajectory may be associated with an expected difference pattern representing a plurality of particular differences between expected motor data of the first motor and expected motor data of the second motor. Comparing the first motor data with the second motor data may include (i) determining an observed difference pattern representing a plurality of differences observed between the first motor data and the second motor data and (ii) comparing the expected difference pattern with the observed difference pattern. Determining the motor failure state may be based on comparing the expected difference pattern with the observed difference pattern.

In some examples, method 600 may further include receiving first historical motor data representing operation of the first motor during past trajectories and receiving second historical motor data representing operation of the second motor during past trajectories. Determining the motor failure state may be further based on the first historical motor data and the second historical motor data.

In some examples, determining the motor failure state may include comparing the first historical motor data and the second historical motor data, and determining the motor failure state based on whether the comparison of the first motor data with the second motor data differs by more than a threshold extent from the comparison of the first historical motor data and the second historical motor data.

In some examples, the first motor data may represent a first motor current drawn by the first motor and the second motor data may represent a second motor current drawn by the second motor. Comparing the first motor data with the second motor data may include determining that the first motor current is greater than the second motor current. Determining the motor failure state may include determining that the first motor has failed.

In some examples, causing the UAV to navigate through the trajectory may include causing the first motor to accelerate from a first speed to a second speed. The first motor data may include a first motor time measurement representing how long the first motor took to accelerate from the first speed to the second speed. Causing the UAV to navigate through the trajectory may also include causing the second motor to accelerate from the first speed to the second speed. The second motor data may include a second motor time measurement representing how long the second motor took to accelerate from the first speed to the second speed. Comparing the first motor data with the second motor data may include comparing the first motor time measurement with the second motor time measurement.

In some examples, the first speed may include a first frequency at which the first and second motors spin and the second speed may include a second frequency at which the first and the second motors spin.

In some examples, the motor failure state may indicate that at least one of the first motor or the second motor has failed. Causing the UAV to navigate based on the motor failure state may include navigating the UAV to a landing location.

In some examples, determining the motor failure state may be further based on the first motor data or the second motor data indicating current being drawn above a predetermined current threshold.

In some examples, causing the UAV to navigate through the trajectory may include causing the UAV to move from a first altitude to a second altitude different from the first altitude.

In some examples, comparing the first motor data with the second motor data may include processing (i) a first control signal provided to the first motor during navigation through the trajectory, (ii) a second control signal provided to the second motor during navigation through the trajectory, (iii) the first motor data, and (iv) the second motor data using a machine learning model that has been trained to identify motor failure states. In some examples, comparing the first motor data with the second motor data may also include generating, using the machine learning model, a motor failure value representing a likelihood that the motor failure state has been experienced during navigation through the trajectory.

In some examples, the first motor may be associated with fewer flight hours compared to the second motor.

In some examples, a computing system (e.g., implemented using circuitry and/or a processor) may be configured to carry out the operations of method 600.

In some examples, the first motor and the second motor may include hover motors, cruise motors, and/or servo motors.

In some examples, the first motor and the second motor may be mounted symmetrically on the UAV.

In some examples, the UAV may include a first UAV and a second UAV. Each of the first UAV and the second UAV may be caused to navigate through the trajectory. The first motor may form part of the first UAV. The second motor may form part of the second UAV.

In some examples, a non-transitory computer readable medium may include program instructions executable by one or more processors to perform the operations of method 600.

In some examples, a first UAV may be caused to navigate through a trajectory and a second UAV may be caused to navigate through the trajectory. First motor data may be received, and may represent operation of a first motor of the first UAV during navigation through the trajectory. Second motor data may be received, and may represent operations of a second motor of the second UAV during navigation through the trajectory. The first motor data may be compared with the second motor data. Based on the comparison of the first motor data and the second motor data, a motor failure state may be determined of at least one of the first motor of the first UAV or the second motor of the second UAV. One or more of the first UAV or the second UAV may be caused to navigate based on the motor failure state.

In some examples, the first UAV and the second UAV may be of a same UAV type (e.g., a same UAV model and/or version thereof).

In some examples, navigating through the trajectory may involve performing one or more flight maneuvers. The first UAV may perform the one or more flight maneuvers at a first location that is different from a second location at which the second UAV performs the one or more flight maneuvers.

In some examples, the first motor of the first UAV may be positioned on the first UAV in a same spatial and/or physical arrangement as the second motor on the second UAV. Thus, the first motor of the first UAV and the second motor of the second UAV may be expected to behave in the same or similar manner during navigation through the trajectory when both of these motors are operating fault-free.

In some examples, the second motor data may represent operations of a plurality of motors of a plurality of UAVs of a UAV fleet during navigation through the trajectory. For example, the second motor data may represent and/or be based on a mean, median, mode, minimum, maximum, and/or other function of respective motor data received from the plurality of motors of the plurality of UAVs.

In some examples, the respective motor data received from the plurality of motors may be determined to represent fault-free operations of the plurality of motors. For example, motor data from motors that experienced motor failure states may be removed prior to determining the second motor data. Thus, the second motor data may indicate what fault-free motor operation looks like across the UAV fleet.

In some examples, determining the motor failure state may include determining that the first motor data differs by at least a threshold difference value from the second motor data obtained from the plurality of UAVs. The threshold difference value may be based on a statistical property of the second motor data obtained from the plurality of UAVs, such as a variance and/or standard deviation of the second motor data. For example, the first motor may be determined to operate failure-free when the first motor data is within x standard deviations (e.g., 0.25, 0.5, 1, 1.25, etc.) of an average of the second motor data obtained from the plurality of UAVs, and the first motor may be determined to have entered a failure state when the first motor data exceeds x standard deviations of the average of the second motor data obtained from the plurality of UAVs. Thus, when the motor data represents motor properties that exhibit a large amount of variation during normal operation, the threshold difference value may be proportionately larger to reduce the likelihood of misclassifying normal motor operation as indicative of a potential motor failure.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

causing an uncrewed aerial vehicle (UAV) to navigate through a trajectory associated with an expected difference pattern representing an expected difference between expected motor data of a first motor and expected motor data of a second motor;

receiving (i) first motor data representing operation of the first motor during navigation through the trajectory and (ii) second motor data representing operation of the second motor during navigation through the trajectory;

determining an observed difference pattern representing an observed difference between the first motor data and the second motor data;

comparing the expected difference pattern with the observed difference pattern;

based on comparing the expected difference pattern with the observed difference pattern, determining a motor failure state; and causing the UAV to navigate based on the motor failure state.

2. The method of claim 1, further comprising:

receiving an indication of at least one motor anomaly, wherein the UAV is caused to navigate through the trajectory based on receiving the indication.

3. The method of claim 1, wherein the trajectory is a predetermined trajectory, and wherein causing the UAV to navigate through the predetermined trajectory comprises driving each of the first motor and the second motor with a control signal having a predetermined profile.

4. The method of claim 1, wherein:

the trajectory is a predetermined trajectory, navigating through the predetermined trajectory is associated with expected performance of the first motor being similar to expected performance of the second motor when navigating through the predetermined trajectory, and determining the observed difference pattern comprises determining that the first motor data does not exhibit at least a threshold extent of similarity to the second motor data.

5. The method of claim 1, wherein:

the trajectory is a predetermined trajectory, navigating through the predetermined trajectory is associated with expected performance of the first motor being different from expected performance of the second motor when navigating through the predetermined trajectory, and determining the observed difference pattern comprises determining that the first motor data does not differ from the second motor data by at least a threshold difference value.

6. The method of claim 1, wherein:

the expected difference pattern represents a plurality of expected differences between the expected motor data of the first motor and the expected motor data of the second motor, and the observed difference pattern represents a plurality of observed differences between the first motor data and the second motor data.

7. The method of claim 1, further comprising:

receiving first historical motor data representing operation of the first motor during one or more past trajectories; and receiving second historical motor data representing operation of the second motor during the one or more past trajectories, wherein determining the motor failure state is further based on the first historical motor data and the second historical motor data.

8. The method of claim 7, wherein determining the motor failure state comprises:

comparing the first motor data with the second motor data;

comparing the first historical motor data and the second historical motor data; and determining the motor failure state based on whether the comparison of the first motor data with the second motor data differs by more than a threshold extent from the comparison of the first historical motor data and the second historical motor data.

9. The method of claim 1, wherein;

the first motor data represents a first motor current drawn by the first motor and the second motor data represents a second motor current drawn by the second motor, comparing the expected difference pattern with the observed difference pattern comprises determining that the first motor current is greater than the second motor current, and determining the motor failure state comprises determining that the first motor has failed.

10. The method of claim 1, wherein causing the UAV to navigate through the trajectory comprises:

causing the first motor to accelerate from a first speed to a second speed, wherein the first motor data comprises a first motor time measurement representing how long the first motor took to accelerate from the first speed to the second speed; and causing the second motor to accelerate from the first speed to the second speed, wherein the second motor data comprises a second motor time measurement representing how long the second motor took to accelerate from the first speed to the second speed, wherein determining the observed difference pattern comprises comparing the first motor time measurement with the second motor time measurement.

11. The method of claim 10, wherein the first speed comprises a first frequency at which the first and second motors spin and the second speed comprises a second frequency at which the first and the second motors spin.

12. The method of claim 1, wherein the motor failure state indicates that at least one of the first motor or the second motor has failed, and wherein causing the UAV to navigate based on the motor failure state comprises navigating the UAV to a landing location.

13. The method of claim 1, wherein determining the motor failure state is further based on the first motor data or the second motor data indicating current being drawn above a predetermined current threshold.

14. The method of claim 1, wherein causing the UAV to navigate through the trajectory comprises causing the UAV to move from a first altitude to a second altitude that is different from the first altitude.

15. The method of claim 1, wherein comparing the expected difference pattern with the observed difference pattern comprises:

processing (i) a first control signal provided to the first motor during navigation through the trajectory, (ii) a second control signal provided to the second motor during navigation through the trajectory, (iii) the first motor data, and (iv) the second motor data using a machine learning model that has been trained to identify motor failure states; and generating, using the machine learning model, a motor failure value representing a likelihood that the motor failure state has been experienced during navigation through the trajectory.

16. The method of claim 1, wherein the first motor is associated with fewer flight hours than the second motor.

17. The method of claim 1, wherein the UAV is a first UAV, wherein each of the first UAV and a second UAV is caused to navigate through the trajectory, wherein the first motor forms part of the first UAV, and wherein the second motor forms part of the second UAV.

18. A computing system configured to:

cause an uncrewed aerial vehicle (UAV) to navigate through a trajectory associated with an expected difference pattern representing an expected difference between expected motor data of a first motor and expected motor data of a second motor;

receive (i) first motor data representing operation of the first motor during navigation through the trajectory and (ii) second motor data representing operation of the second motor during navigation through the trajectory;

determine an observed difference pattern representing an observed difference between the first motor data and the second motor data;

compare the expected difference pattern with the observed difference pattern;

based on comparing the expected difference pattern with the observed difference pattern, determine a motor failure state; and cause the UAV to navigate based on the motor failure state.

19. The computing system of claim 18, wherein the first motor and the second motor are mounted symmetrically on the UAV.

20. A non-transitory computer readable medium comprising program instructions executable by one or more processors to perform operations, the operations comprising:

causing an uncrewed aerial vehicle (UAV) to navigate through a trajectory associated with an expected difference pattern representing an expected difference between expected motor data of a first motor and expected motor data of a second motor;

receiving (i) first motor data representing operation of the first motor during navigation through the trajectory and (ii) second motor data representing operation of the second motor during navigation through the trajectory;

determining an observed difference pattern representing an observed difference between the first motor data and the second motor data;

comparing the expected difference pattern with the observed difference pattern;

based on comparing the expected difference pattern with the observed difference pattern, determining a motor failure state; and causing the UAV to navigate based on the motor failure state.

* * * * *